United States Patent
Cross et al.

(10) Patent No.: US 9,116,997 B2
(45) Date of Patent: Aug. 25, 2015

(54) PRESENTING USER PREFERENCE ACTIVITIES

(71) Applicants: Adam Cross, San Francisco, CA (US); Chuck Kao, Dublin, CA (US); Gregory Charles McNutt, Sunnyvale, CA (US)

(72) Inventors: Adam Cross, San Francisco, CA (US); Chuck Kao, Dublin, CA (US); Gregory Charles McNutt, Sunnyvale, CA (US)

(73) Assignee: Alibaba.com Limited (KY)

( * ) Notice: Subject to any disclaimer, the term of this patent is extended or adjusted under 35 U.S.C. 154(b) by 27 days.

(21) Appl. No.: 13/623,742

(22) Filed: Sep. 20, 2012

(65) Prior Publication Data

US 2013/0080427 A1    Mar. 28, 2013

Related U.S. Application Data

(60) Provisional application No. 61/537,951, filed on Sep. 22, 2011.

(51) Int. Cl.
*G06F 17/30* (2006.01)
*G06Q 30/02* (2012.01)

(52) U.S. Cl.
CPC .... *G06F 17/30867* (2013.01); *G06F 17/30554* (2013.01); *G06F 17/30648* (2013.01); *G06Q 30/0224* (2013.01)

(58) Field of Classification Search
CPC .......... G06F 17/3053; G06F 17/30554; G06F 17/30648; G06F 17/30663; G06F 17/30867; G06Q 30/0224
USPC .......................... 707/722, 723, 736, 748, 749
See application file for complete search history.

(56) References Cited

U.S. PATENT DOCUMENTS

| | | | |
|---|---|---|---|
| 7,669,123 B2 | 2/2010 | Zuckerberg et al. | |
| 8,126,879 B2* | 2/2012 | Gemmell et al. | 707/723 |
| 8,171,128 B2 | 5/2012 | Zuckerberg et al. | |
| 8,402,094 B2 | 3/2013 | Bosworth et al. | |
| 8,577,911 B1* | 11/2013 | Stepinski et al. | 707/765 |
| 8,768,863 B2 | 7/2014 | Gubin et al. | |
| 2006/0122974 A1 | 6/2006 | Perisic | |
| 2009/0006373 A1* | 1/2009 | Chakrabarti et al. | 707/5 |
| 2009/0150340 A1 | 6/2009 | Lhuillier et al. | |
| 2009/0271370 A1* | 10/2009 | Jagadish et al. | 707/3 |
| 2009/0271524 A1* | 10/2009 | Davi et al. | 709/231 |
| 2010/0257183 A1* | 10/2010 | Kim et al. | 707/748 |
| 2010/0268661 A1 | 10/2010 | Levy et al. | |
| 2010/0325127 A1* | 12/2010 | Chaudhuri et al. | 707/759 |
| 2011/0010364 A1* | 1/2011 | Ahtisaari et al. | 707/724 |
| 2011/0066613 A1 | 3/2011 | Berkman et al. | |
| 2011/0225293 A1 | 9/2011 | Rathod | |
| 2012/0150772 A1 | 6/2012 | Paek et al. | |
| 2012/0290637 A1 | 11/2012 | Perantatos et al. | |
| 2013/0031106 A1* | 1/2013 | Schechter et al. | 707/749 |
| 2013/0046704 A1* | 2/2013 | Patwa et al. | 705/321 |
| 2014/0195549 A1* | 7/2014 | Ahn et al. | 707/749 |

* cited by examiner

*Primary Examiner* — Phong Nguyen
(74) *Attorney, Agent, or Firm* — Van Pelt, Yi & James LLP

(57) ABSTRACT

Determining preference activities to present to a current user includes: obtaining a plurality of candidate preference activities; determining a recommendation weight for one of the plurality of candidate preference activities with respect to the current user; and presenting at least some of the plurality of candidate preference activities based on recommendation weights corresponding to the plurality of candidate preference activities.

20 Claims, 22 Drawing Sheets

| Items | | | | | | | |
|---|---|---|---|---|---|---|---|
| Item 1 | Item 3 | Item 10 | Item 6 | Item 7 | Item 11 | Item 2 | |
| Item 6 | Item 4 | Item 7 | | | | | |
| Item 1 | Item 11 | Item 2 | Item 5 | Item 7 | | | |
| Item 13 | Item 8 | Item 9 | Item 4 | | | | |
| ⋮ | ⋮ | ⋮ | | | | | |

| Users | | | | | |
|---|---|---|---|---|---|
| User 1 | User 2 | User 3 | User 4 | ⋮ | ⋮ |

FIG. 10

| Items | Users | |
|---|---|---|
| Item 1 | User 1 | User 3 |
| Item 2 | User 1 | User 3 |
| Item 3 | User 1 | |
| Item 4 | User 2 | |
| Item 5 | User 3 | |
| Item 6 | User 1 | User 2 |
| Item 7 | User 2 | User 3 |
| Item 8 | User 1 | |
| ... | ... | ... |
| Item 11 | User 1 | User 3 |

PRESENTING USER PREFERENCE ACTIVITIES

CROSS REFERENCE TO OTHER APPLICATIONS

This application claims priority to U.S. Provisional Patent Application No. 61/537,951 entitled ONLINE CONVERSATIONS BASED ON USER SIMILARITIES filed Sep. 22, 2011 which is incorporated herein by reference for all purposes.

BACKGROUND OF THE INVENTION

At a social networking service platform, a user may desire to be informed of the user's friends' interactions and activities at the platform. However, depending on the number of friends the user has at the platform and/or the volume of the friends' interactions and activities, the user may be overwhelmed by notifications of all such interactions and activities at the platform. It would be desirable to present to a user a selected subset of such interactions and activities that may be of most interest to a user so that the user may consume the information in a more time efficient manner.

BRIEF DESCRIPTION OF THE DRAWINGS

Various embodiments of the invention are disclosed in the following detailed description and the accompanying drawings.

FIG. 10 is an example of a user-item database that maps each user to a list of items that the user has indicated interest.

FIG. 11 is an example of an item-user database that maps each item to a list of users who have indicated interest in the item.

FIG. 17 illustrates an example flavor page.

FIG. 18 illustrates an example flavor page that gives a preview of the users who made comments in a conversation thread.

FIG. 19 is an example conversation page.

DETAILED DESCRIPTION

Figure 1:
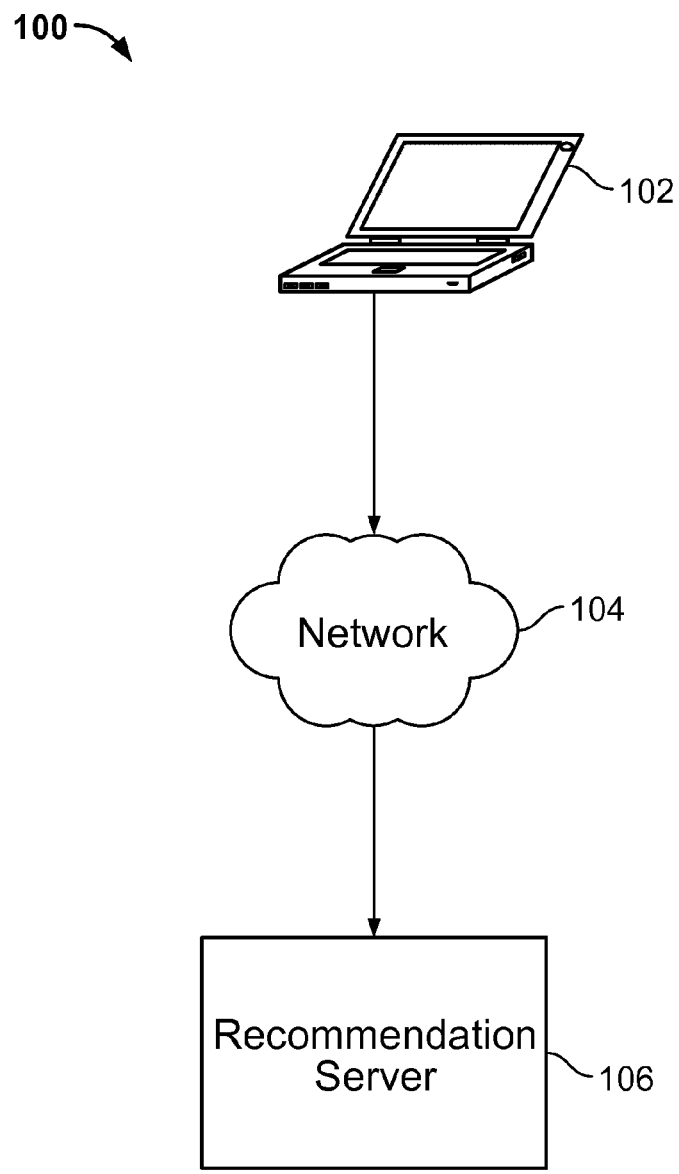
FIG. 1 is a diagram of an embodiment of a system for providing a social networking service platform that presents to a current user preference activities of various users.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a social networking service platform (e.g., Socialflavor™) that presents to a current user preference activities of various users in a ranked order are described. In some embodiments, a "current user" refers to a user who is currently logged onto the social networking service platform (e.g., via having performed authentication). In some embodiments, a "preference activity" refers to an instance of a user indicating a preference for an item associated with the social networking service platform. Once the user indicates preference for the item, the item is stored as an item of interest for that user and metadata is also stored for the preference activity. Examples of items of interest may include, but are not limited to, products, movies, books, music, public figures, activities, and locations. For example, a preference activity may include user Alice at the platform indicating a preference (e.g., through the selection of a button) for the book "The Catcher in the Rye." In some embodiments, in response to receipt of an indication associated with presenting preference activities for a current user, a recommendation weight is determined for each candidate preference activity to potentially present to the current user. In some embodiments, each candidate preference activity is associated with a user who may be the current user or a user other that the current user. In some embodiments, each candidate preference activity may be associated with the current user or a user other than the current user who has been determined to be relevant to the current user. Similarities between users will be described further below. In some embodiments, a recommendation weight is determined for each candidate preference activity based on one or more of the following: a time indication associated with the preference activity, metadata associated with the current user, metadata associated with the user associated with the candidate preference activity, and metadata associated with the item associated with the candidate preference activity. In some embodiments, those candidate preference activities associated with the highest recommendation weights are presented most conspicuously for the current user (e.g., at a feed page populated for the current user). For example, candidate preference activities may be presented conspicuously by presenting them at the top of the feed page and/or toward the left-hand side of the feed page (e.g., assuming that the readers are accustomed to reading from the left to the right).

In some embodiments, one or more comments may be posted by a user in association with a particular candidate preference activity that is presented for the current user. In some embodiments, the user associated with a comment may be the current user or another user. In some embodiments, in the event that there are over a threshold number of comments associated with a presented candidate preference activity, then a display score, as will be described further below, is determined for each such comment based on the nature of the comment and/or the user(s) who have interacted with the comment. Then, those comments with the highest display scores will be presented with the presented candidate preference activity for the current user (while the other comments will be hidden and/or collapsed).

By determining recommendation weights for candidate preference activities, the preference activities may be presented in a ranked order of associated recommendation weights as determined with respect to a particular current user. As a result, the current user may be able to consume the preference activity information in a prioritized and efficient manner, since it is assumed that the current user may be able to view the most potentially interesting preference activities (based on the magnitudes of the preference activities' recommendation weights) first and more easily than the preference activities of less potential interest. Furthermore, in the event that there are a great number of comments associated with a presented candidate preference activity, only those comments determined to be of the most potential interest (based on the magnitude of the comments' display scores) to the current user are presented for the current user.

FIG. 1 is a diagram of an embodiment of a system for providing a social networking service platform that presents to a current user preference activities of various users. In the example, system 100 includes client 102, network 104, and recommendation server 106. Network 104 comprises high-speed data networks and/or telecommunication networks. Client 102 is configured to communicate with recommendation server 106 over network 104.

Client 102 is configured to enable a user to access the social networking service platform provided by recommendation server 106. In some examples, the social networking service platform is referred to as Socialflavor™. For example, the social networking service platform may comprise a website and may be accessed at a particular uniform resource locator (URL) (e.g., "www.socialflavor.com"). In some embodiments, the user may be able to access the social networking service platform and import items of interest that the user has indicated at external websites (e.g., Facebook®, Netflix®). In some embodiments, the user may also be able to create items of interest at the social networking service platform. In various embodiments, the user may be able to indicate preference for items of interest (e.g., items that the user did not import from an external website and/or previously indicate preference for) at the social networking service platform. In some embodiments, each indication of preference for an item is stored as a preference activity with metadata that includes data associated with at least the item and the user. In some embodiments, metadata stored for a preference activity may also include additional information such as a time indication (e.g., timestamp) associated with when the user indicated preference. In some embodiments, the user may be able to view his or her preferred items at a webpage (which is sometimes referred to as the user's profile page) of the social networking service platform. In some embodiments, the user may be associated with other users at the social networking service platform through a platform-recognized relationship such as a friendship or a status of following the other user or being followed by the other user, for example. Such platform-recognized relationships indicate greater interest among the related users and may be used to determine which candidate preference activities to present to a current user at an opportunity to present such information to the current user.

In some embodiments, an indication is received at recommendation server 106, where the indication is associated with presenting preference activities for a current user using client 102. For example, the indication may be generated when the current user makes a selection at the website associated with the social networking service platform that is configured to generate a feed of user preference activity of interest for the current user. In response to the indication, recommendation server 106 is configured to determine a set of candidate preference activities and then determine a recommendation weight for each of the candidate preference activities. In some embodiments, a set of candidate preference activities may comprise at least some of the preference activities associated with those other users who are determined to be relevant to the current user (e.g., the top 10 other users who have the most number of similar items of interest as the current user). In some embodiments, recommendation server 106 is configured to determine a recommendation weight for each candidate preference activity based on one or more of the following: a time indication associated with the preference activity, metadata associated with the current user, metadata associated with the user associated with the candidate preference activity, and metadata associated with the item associated with the candidate preference activity.

In some embodiments, recommendation server 106 is configured to rank the candidate preference activities of the set based on a descending order of their respective recommendation weights. In some embodiments, the candidate preference activity with the highest recommendation weight is displayed at a first position at the display (e.g., feed) webpage, the candidate preference activity with the second highest recommendation weight is displayed at a second position at the display page, and so forth. In some embodiments, the earlier positions for display at the webpage are designed to be more conspicuous for the current user to view. For example, the first position may be located at the top-most row and left-most corner of the webpage and the second position may be located at the top-most row and to the right of the first position. In some embodiments, only candidate preference activities associated with recommendation weights above a predetermined threshold are presented for the current user. In some embodiments, only the top predetermined number of candidate preference activities in the ranked list is presented for the current user. For example, each preference activity may be displayed as a tile that includes an image (if available) that is associated with the preferred item, the name of the preferred item, and identifying information associated with the user that preferred the item.

In some embodiments, the current user or a different user may post comments and/or other interactions associated with preference activities. If such preference activities are presented for a current user, recommendation server 106 is configured to determine a display score for each such comment and selectively display the comments associated with each presented candidate preference activity based on the determined display scores. Therefore, recommendation server 106 is configured to use recommendation weights to selectively display and highlight those preference activities and the comments thereof that are determined to be of the most interest to the current user.

Figure 2:
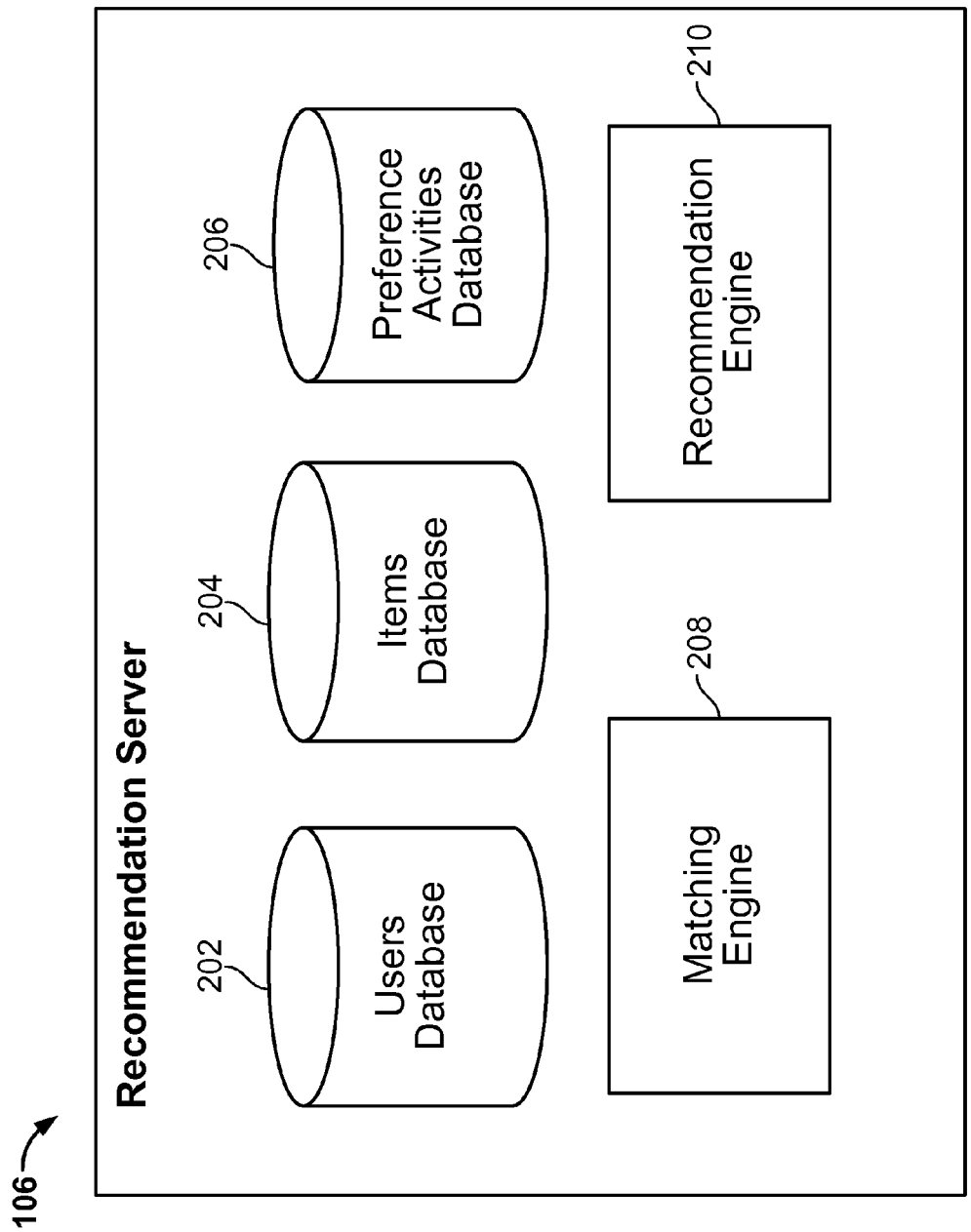
FIG. 2 is a diagram showing an example of a recommendation server.

FIG. 2 is a diagram showing an example of a recommendation server. In some embodiments, recommendation server 106 may be implemented using the example of FIG. 2. In the example, the recommendation server includes users database 202, items database 204, preference activities database 206, matching engine 208, and recommendation engine 210.

Each of users database 202, items database 204, and preference activities database 206 may be implemented using one or more databases. Each of matching engine 208 and recommendation engine 210 may be implemented using one or both of hardware and software.

Matching engine 208 is configured to find other users who have similar items of interest as a current user. Each user that has at least one item of interest as the current user is sometimes referred to as a "matching user," herein. In some embodiments, matching engine 208 is configured to receive a request associated with finding one or more other users that share the most number of similar items of interest as a current user. In some embodiments, matching engine 208 is configured to access metadata of items database 204 and/or users database 202 to determine which other users share similar items of interest as the current user and how many overlapping items there are between each other user and the current user. Then, the other users that are found to have overlapping items with the current user are ranked by their respective numbers of overlapping items. In some embodiments, for each matching user, each additional overlapping item with the current user increments the count associated with the user by 1 and the total number of overlapping items is represented by the count associated with that other user. In some embodiments, matching engine 208 is configured to determine N number of other users that are determined to be the most similar as the current user (e.g., have the most number of overlapping items of interest as the current user), where N may be a predetermined integer or a value input by the current user or a system administrator. In some embodiments, identifiers associated with at least some of the matching users are presented to the current user so that the current user may select to view one or more of those other users' profiles and/or follow one or more of those other users. In some embodiments, instead of relying on just the number of overlapping items, each matching user receives a weighted score. The factors affecting the score include the matching user's social credibility (measured by, for example, whether the user has made contributions to the platform recently, and how often the user has contributed, whether the user is endorsed by other users, etc.), whether the matching user is already in the current user's network, etc. For example, the count associated with a matching user may be multiplied by the weighted score and this weighted count may be compared against those of other users to determine which users are the most similar (e.g., the users with the greatest weighted counts are determined to be the most similar). This way, a user who has low credibility (i.e., new to the system) but has indicated an interest in a large number of items and therefore has a lower weighted score will not likely emerge as one of the more similar users to the current user that requested the matching process.

In some embodiments, at least a certain number of matching users with respect to the current user as determined by matching engine 208 may be determined to be "relevant" to the current user. For example, one or more rules may be configured to determine whether a matching user is relevant to the current user on, e.g., whether the matching user has over a threshold number of overlapping items with the current user and/or meets other criteria. In the event that a matching user is determined to be relevant to the current user, preference activities associated with the matching user may be included in the set of candidate preference activities considered to be presented to the current user.

Items database 204 is configured to store metadata associated with items indicated to be of interest to one or more users at the platform. In some embodiments, each item is stored with an identifier, accompanying description, and/or category. In some embodiments, only one entry exists for each unique item. In some embodiments, each item is stored with mappings (e.g., references) to the users (e.g., whose metadata is stored at users database 202) that have indicated interest in that item (e.g., at the platform or an external source website). In some embodiments, each item is stored with mappings to sets of metadata associated with preference activities (e.g., whose metadata is stored at preference activities database 206) that are associated with that item.

Users database 202 is configured to store metadata associated with users with registered accounts at the platform. In some embodiments, each user is stored with basic information, an image, and a logon identifier and/or password and/or credential information associated with one or more other external source websites. In some embodiments, each user is stored with identifiers of other users at the platform with whom the user has a platform-recognized relationship (e.g., followers or other users that the user follows). In some embodiments, each user is stored with mappings (e.g., references) to the items (e.g., whose information is stored at items database 204) in which the user has indicated interest. In some embodiments, each user is stored with mappings to sets of metadata associated with preference activities (e.g., whose metadata is stored at preference activities database 206) that are associated with that user.

In some embodiments, for each user, each mapping to an item that was indicated to be of interest to the user is given the same interest degree value (e.g., 1), such that it is assumed that the user enjoys each item equally. In some other embodiments, for each user, each mapping to an item that was indicated to be of interest to the user is associated with a weighted interest degree value that is input by the user on a given scale (e.g., given a scale of zero to one, a user can input a 1 for an item of interest that the user enjoys immensely and only 0.1 for another item of interest for which the user expresses relatively less interest). For example, the weighted interest degree values corresponding to items of interest for a current user may be used in determining other users with similar items of interest and also those other users with potentially similar degrees of interest in the overlapping items.

In some embodiments, each user is stored with provided reasons/context/moods, if any, associated with a particular item of interest. For example, when the user indicated that the user preferred a particular restaurant, the user may have provided that the context in which the user prefers to enjoy the restaurant is on a first date. In some embodiments, if a user is associated with a particular status that is associated with one or more items, that status information is also stored for that user at users database 202. In some embodiments, each user is assigned a finite amount of in-platform social currency so that the amount of social currency "spent" on each item that the user has indicated to prefer is the total number of the user's items of interest divided by the user's social currency. So the greater the amount of currency that a user has spent on a preferred item, the fewer the items the user prefers and so each preference for the user may be given greater weight. In some embodiments, the social currency of a user may be earned and built over time as a result of the user performing more and more interactions (e.g., commenting) at the platform.

Preference activities database 206 is configured to store metadata associated with each preference activity. As mentioned above, a preference activity refers to an instance of a user indicating a preference for an item associated with the social networking service platform. So even if two different users each indicated preference for the same item, each such indication is stored as a separate preference activity. In some embodiments, the set of metadata associated with each preference activity includes at least data associated with the preferred item and the user that indicated preference. In some embodiments, the set of metadata associated with each preference activity includes a time indication (e.g., timestamp) associated with when the user indicated preference for the item. In some embodiments, the set of metadata associated with each preference activity includes data associated with one or more interactions that have been made with respect to the preference activity. For example, one such interaction is a user posted comment associated with the preference activity. In some embodiments, the set of metadata associated with each preference activity includes mappings to sets of metadata associated with the associated item of items database 204 and the associated user of users database 202.

Recommendation engine 210 is configured to determine which preference activities to present for a current user. In some embodiments, recommendation engine 210 is configured to determine preference activities to present to a current user in response to receiving an indication to populate a feed webpage associated with the current user. In some embodiments, recommendation engine 210 is configured to determine a set of candidate preference activities from the preference activities stored at preference activities database 206. For example, recommendation engine 210 may determine all preference activities stored at preference activities database 206 as part of the candidate set or a subset of all preference activities stored at preference activities database 206. For example, the subset of all preference activities stored at preference activities database 206 may include those preference activities associated with users that are determined to be relevant to the current user. In some embodiments, recommendation engine 210 is configured to determine a recommendation weight for each preference activity of the candidate set based on metadata associated with the preference activity from preference activities database 206, metadata associated with the relevant user from users database 202, and/or metadata associated with the preferred item stored at items database 204. Recommendation engine 210 is then configured to rank the candidate preference activities in a descending order of associated recommendation weights. In some embodiments, recommendation engine 210 is configured to determine to present at least a portion of the ranked candidate preference activities with the highest recommendation weights in an order determined based on the recommendation weights. If any of the presented activities is associated with one or more user interactions such as comments (as indicated by the metadata stored at preference activities database 206), then, in some embodiments, recommendation engine 210 is configured to determine a display score for each comment based on one or more of data associated with the preference activity from preference activities database 206, metadata associated with the relevant user from users database 202, and/or metadata associated with the preferred item stored at items database 204. Recommendation engine 210 may display a subset of all the comments associated with a presented preference activity based on the comments' respective display scores.

Figure 3:
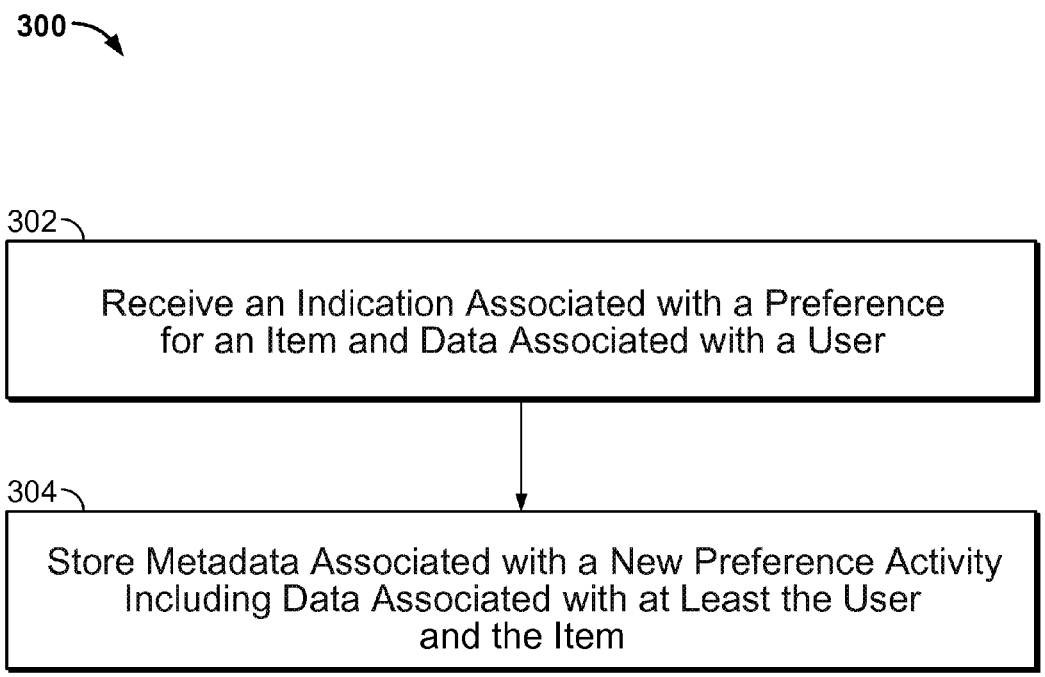
FIG. 3 is a flow diagram showing an embodiment of a process for storing a preference activity.

FIG. 3 is a flow diagram showing an embodiment of a process for storing a preference activity. In some embodiments, process 300 may be implemented at system 100.

At 302, an indication associated with a preference for an item and data associated with a user is received. In some embodiments, a user may select a selectable element/button at a user interface associated with indicating preference for a particular item. For example, while a user is browsing another user's profile that includes that user's set of items of interest (e.g., that were either imported by that user from an external website or previously indicated to be preferred by that user at the platform), the user may select an element associated with a particular item that indicates that the user liked that item.

For example, user Alice is browsing through the set of items that user Brad had previously "liked" at Brad's Socialflavor™ profile. In this example of the Socialflavor™ platform, a user may select a "like" selectable element associated with an item to indicate a preference for that item. User Alice sees that Brad has previously indicated that he "liked" the movie "The Matrix" and remembered how much she enjoyed that movie and so Alice selects the "like" element associated with "The Matrix" at Brad's profile. Now, the movie "The Matrix" will be featured as a "liked" item (i.e., an item of interest) at Alice's Socialflavor™ profile and it will also be stored as a preference activity associated with Alice.

At 304, metadata associated with a new preference activity including data associated with at least the user and the item is stored. Once the user has made the selection with respect to the selectable element/button at a webpage associated with indicating preference for the particular item, a preference activity is stored. The metadata to be stored for this preference activity includes at least identifying information associated with the user that made the indication and the preferred item. In some embodiments, the metadata also includes a time indication associated with when the user selected the element. This time indication may be used subsequently to determine an age for the preference activity in determining a recommendation weight for it.

Returning to the previous example, Alice's "like" of the movie "The Matrix" was selected at 12:30 pm on Aug. 15, 2012. The metadata stored for the preference activity includes identifying information associated with Alice, "The Matrix" movie, and the time of 12:30 pm on Aug. 15, 2012. As will be described later, Alice's "like" of the movie "The Matrix" may be presented for a user (either Alice herself or another user) at Socialflavor™ in response to an indication to determine preference activities to display for that user.

Figure 4:
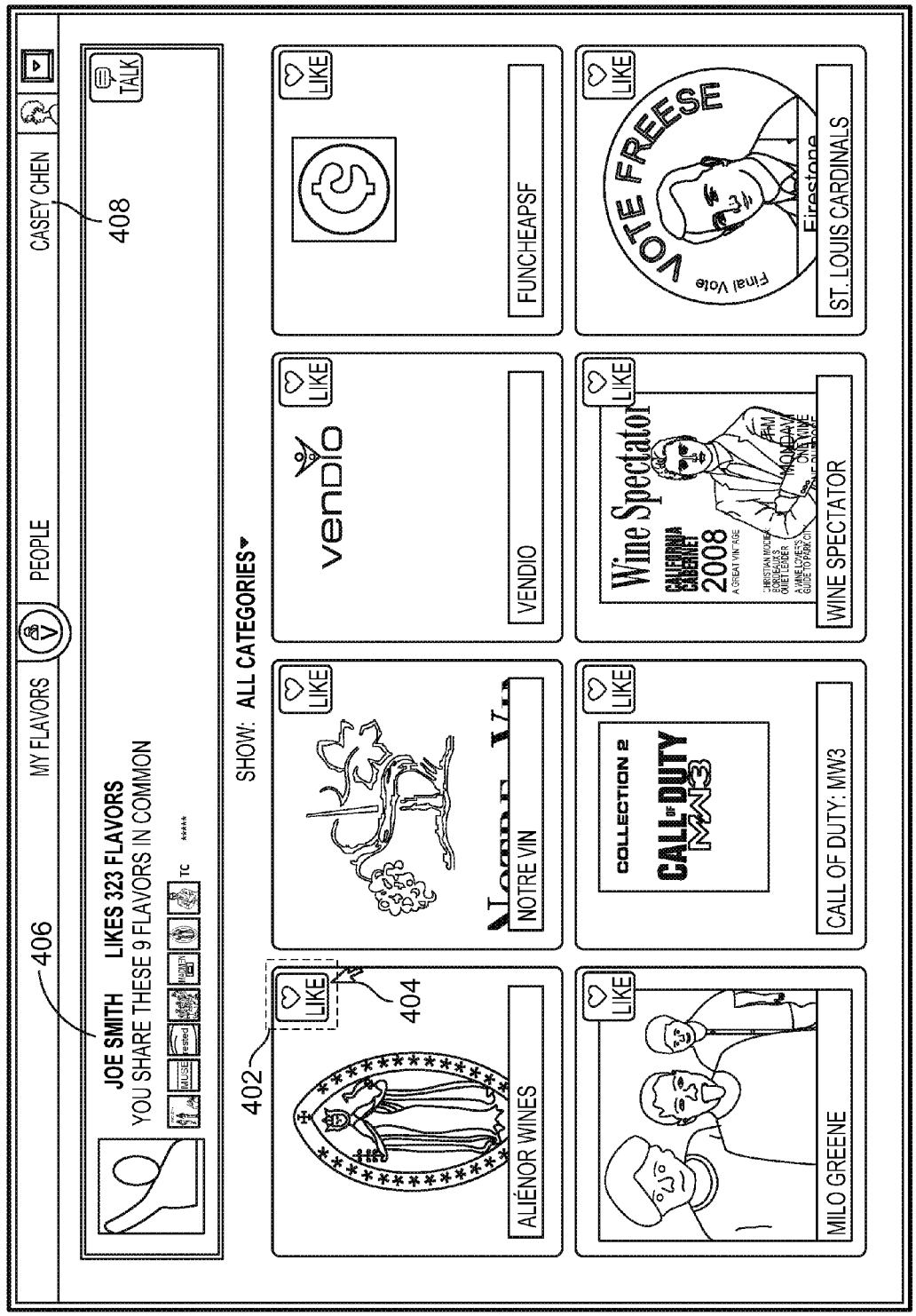
FIG. 4 is a diagram showing an example of a user interface configured to provide selectable elements associated with indicating preference for items of interest.

FIG. 4 is a diagram showing an example of a user interface configured to provide selectable elements associated with indicating preference for items of interest. In some embodiments, the user interface of FIG. 4 is presented to a current user that is logged onto the example social networking service platform, Socialflavor™. In the example, the name ("Casey Chen") and an image of the current user are indicated in area 408 of the user interface. For example, Casey may be browsing Socialflavor™ by checking out the profile webpages of various others. In the example shown, Casey has come across the profile webpage associated with the other user ("Joe Smith") that is indicated in area 406. As shown in area 406, Joe likes 323 flavors, at least some of which are shown on the profile. In the example social networking service platform, Socialflavor™, items of interest are referred to as "flavors." Various flavors associated with Casey are displayed at the profile webpage. For example, such flavors may be items that Joe has previously imported from external websites and/or indicated as being "liked" flavors at Socialflavor™. Each such flavor is presented as a tile that includes an associated image, if available, and the name of the flavor, with a selectable "like" element in the top right-hand corner of the tile. Some flavors shown in Joe's profile includes "Aliénor Wines," "Notre Vin," "Vendio," and "FunCheapSF," for example. For current user Casey to indicate a preference for a flavor at Joe's profile, Casey may manipulate cursor 404 over selectable element 402. Then Casey may select selectable element 402 to indicate preference for the flavor of "Aliénor Wines."

Figure 5:
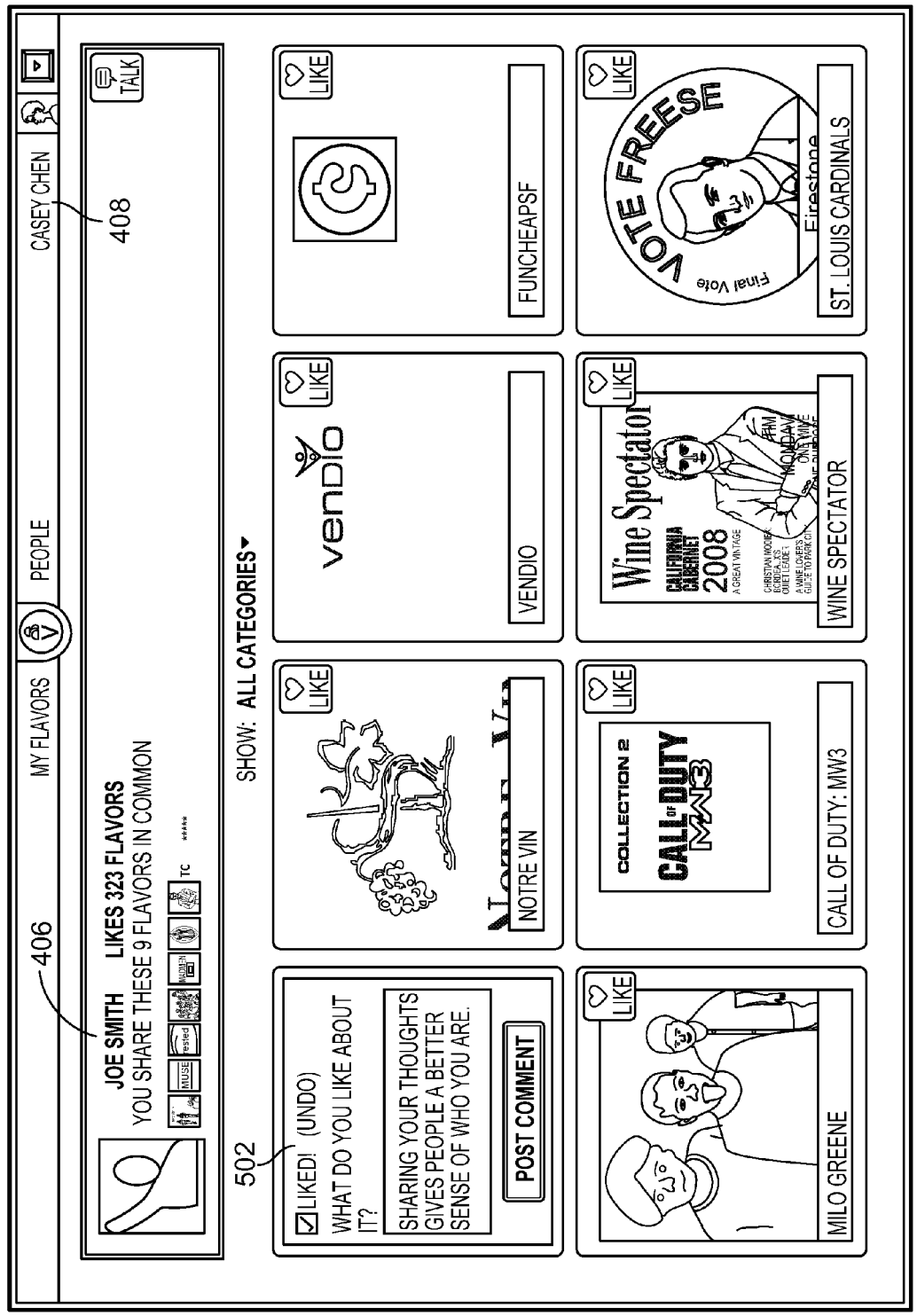
FIG. 5 is a diagram showing an example of a user interface configured to provide selectable elements associated with indicating preference for items of interest in response to selection of one such selectable element.

FIG. 5 is a diagram showing an example of a user interface configured to provide selectable elements associated with indicating preference for items of interest in response to selection of one such selectable element. The user interface of this example shows the response to Casey selecting selectable element 402 associated with flavor "Aliénor Wines" of the user interface of FIG. 4. As shown in the example, the tile previously associated with "Aliénor Wines" is now updated to show area 502 that confirms that the flavor has been selected ("Liked!"). Now, "Aliénor Wines" is stored as an item of interest of Casey's and also part of a preference activity associated with Casey. The metadata of the preference activity stored for this selection will include the identifying information associated with Casey and the item of "Aliénor Wines." Such preference activity metadata may also include the time (e.g., 2:04 pm on Aug. 15, 2012) at which Casey selected selectable element 402. If Casey additionally enters text in the text input box within area 502 (under "What do you like about it?"), then those text/comments may be stored as part of the metadata associated with this preference activity.

Figure 6:
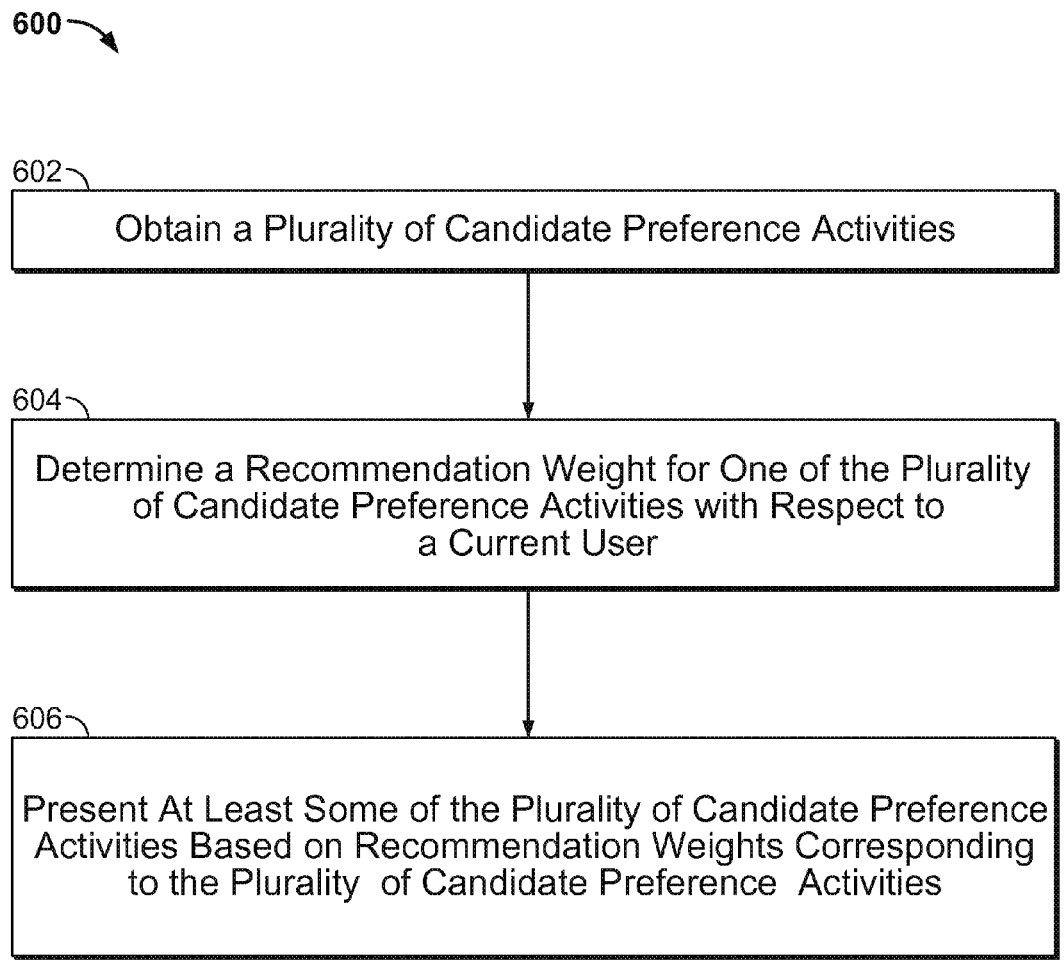
FIG. 6 is a flow diagram showing an embodiment of a process for presenting preference activities.

FIG. 6 is a flow diagram showing an embodiment of a process for presenting preference activities. In some embodiments, process 600 may be implemented at system 100.

Process 600 may be used to determine which preference activities are to be presented and in which order for a current user. For example, process 600 may be initiated in response to the current user selecting to view a feed page at the platform, where preference activities are to be populated at the feed page for the current user.

At 602, a plurality of candidate preference activities is obtained. In some embodiments, any preference activity for which metadata has been stored is considered to be a candidate preference activity. In some embodiments, a set of users who are relevant to the current user is first determined and then only the preference activities associated with relevant users and in some embodiments, the preference activities associated with the current user, are considered to be included in the set of candidate preference activities. In some embodiments, a user is determined to be relevant to the current user based at least in part on how similar this user is to the current user (e.g., how many overlapping items of interest there are between the user and the current user), as will be further described with FIGS. 10-13.

At 604, a recommendation weight is determined for one of the plurality of candidate preference activities with respect to a current user. In some embodiments, a recommendation weight is determined for each candidate preference activity with respect to a current user. In some embodiments, the recommendation weight determined for a candidate preference activity is based on one or more of the following: a time indication associated with the preference activity, metadata associated with the current user, metadata associated with the user associated with the candidate preference activity, and metadata associated with the item associated with the candidate preference activity. For example, the recommendation weight comprises a value that is determined as a combination/function of various other values assigned to each of the time indication associated with the preference activity, metadata associated with the current user, metadata associated with the user associated with the candidate preference activity, and/or metadata associated with the item associated with the candidate preference activity.

Generally, the higher the magnitude of the recommendation weight determined for a candidate preference activity, the more the candidate preference activity is determined to be of interest to the current user. For example, a candidate preference activity that is associated with an older age (where the age is determined by the difference between the timestamp of the preference activity and the current time) will be attributed a lower recommendation weight than a similar candidate preference activity of a younger age. In another example, a candidate preference activity associated with a user that is determined to be very similar to the current user (e.g., the two users have numerous overlapping items of interest) may be attributed a greater recommendation weight than a similar candidate preference activity associated with a user who is less similar to the current user.

At 606, at least some of the plurality of candidate preference activities is presented based on recommendation weights corresponding to the plurality of candidate preference activities. In some embodiments, the candidate preference activities are ranked based on a descending order of their respective recommendation weights. In some embodiments, the candidate preference activities are presented in such a ranked order for the current user. Those candidate preference activities with higher recommendation weights are generally prioritized higher and therefore presented more conspicuously than candidate preference activities with lower recommendation weights. For example, candidate preference activities with higher recommendation weights may be presented higher on the feed page (so that the current user may see them without performing scrolling or much scrolling down the page) and candidate preference activities with lower recommendation weights are presented lower on the feed page (so that the current user may need to perform more scrolling to see them).

In some embodiments, a threshold recommendation weight value may be configured such that only those of the candidate preference activities whose recommendation weights exceed the threshold recommendation weight may be presented while the remainder of the candidate preference activities is not presented. In some embodiments, a set number of candidate preference activities from the top of the ranked list are presented while the remainder of the candidate preference activities is not presented.

Figure 7:
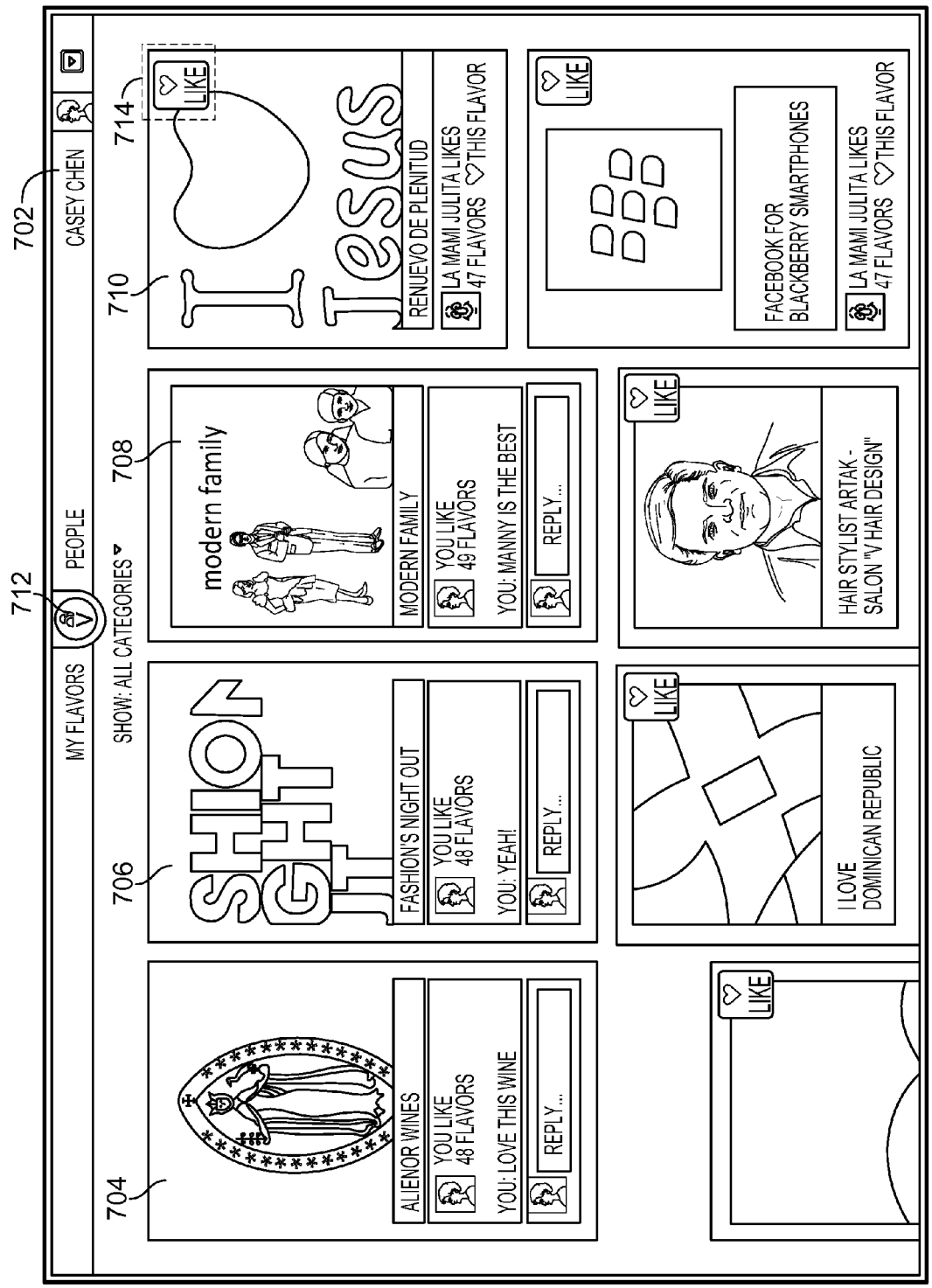
FIG. 7 is an example of a user interface associated with a feed page populated for a current user.

FIG. 7 is an example of a user interface associated with a feed page populated for a current user. In some embodiments, the user interface of FIG. 7 is presented to a current user that is logged onto the example social networking service platform, Socialflavor™, in response to the current user's selection to view a feed page. In the example, the name ("Casey Chen") and picture of the current user is indicated in area 702 of the user interface. In the example, the selectable element at the user interface that is associated with presenting the feed page for Casey is icon 712, at the top of the user interface. As shown in the example, the feed page for Casey includes several preference activities, including preference activities 704, 706, 708, and 710. In the example, each of preference activities 704, 706, 708, and 710 is represented as a tile with an image associated with the preferred item, the name of the preferred item, the name of the user that indicated preference for the item, and comments (if any) that have been posted in association with that preference activity. In the example, each of preference activities 704, 706, and 708 has already been indicated to be preferred by the current user, Casey, and so includes the text "You like 48 flavors" and does not show a selectable element such as selected element 714. Meanwhile, preference activity 710 has not yet been indicated to be preferred by the current user Casey, but has been indicated to be preferred by user "La Mami Julita." The preference activities presented at this user interface may be determined to be displayed based at least in part on a process such as process 600. In this example, preference activity 704 is associated with the position at the user interface associated with the highest recommendation weight, preference activity 706 is associated with the position at the user interface associated with the second highest recommendation weight, preference activity 708 is associated with the position at the user interface associated with the third highest recommendation weight, and so on. In some embodiments, the preference activities to be shown at the feed page user interface may be determined each time the user selects icon 712.

Figure 8:
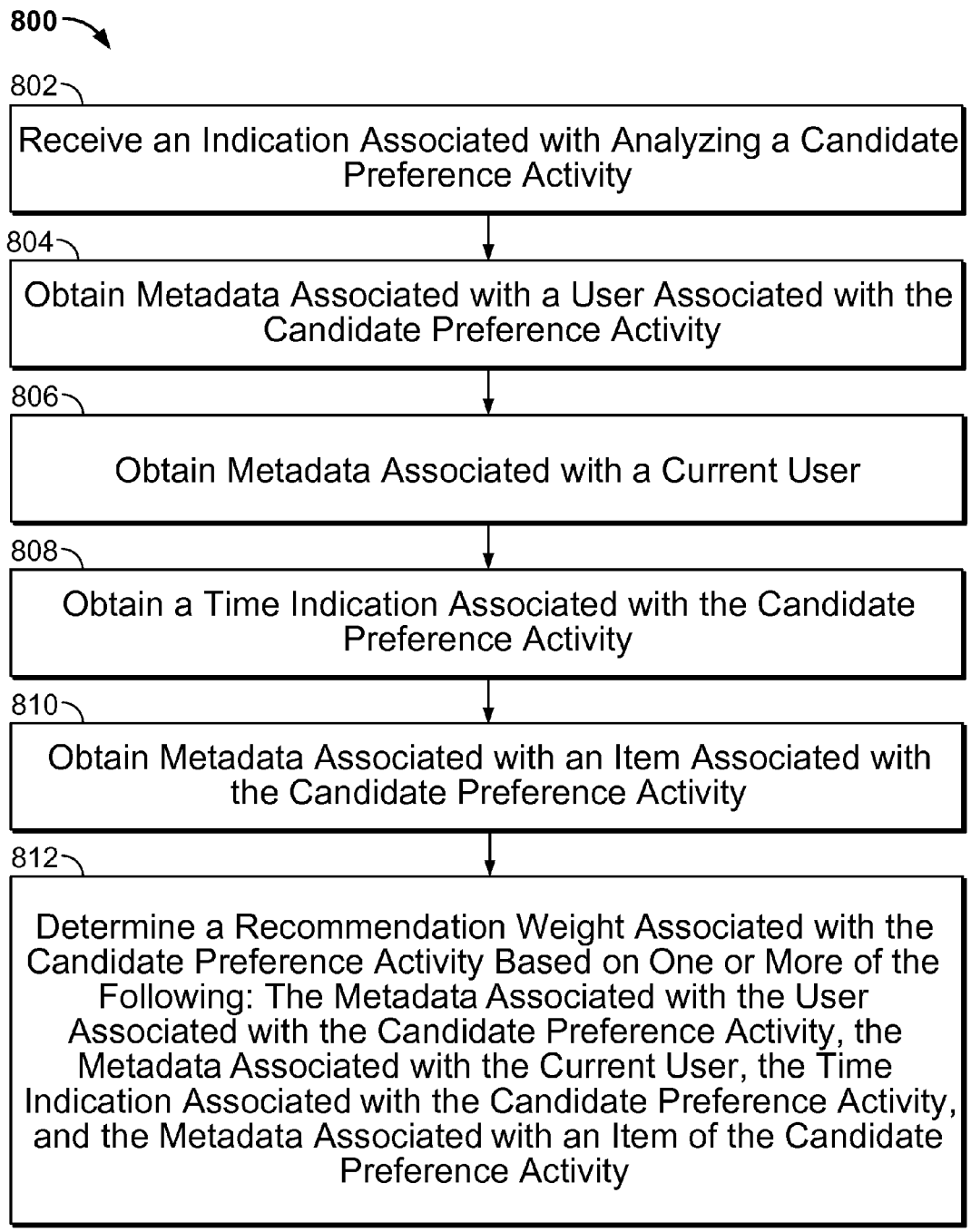
FIG. 8 is a flow diagram showing an embodiment of a process for determining a recommendation weight for a candidate preference activity.

FIG. 8 is a flow diagram showing an embodiment of a process for determining a recommendation weight for a candidate preference activity. In some embodiments, process 800 may be implemented at system 100. In some embodiments, 604 of process 600 may be implemented using process 800.

At 802, an indication associated with analyzing a candidate preference activity is received.

At 804, metadata associated with a user associated with the candidate preference activity is obtained. Metadata associated with the user that indicated preference for the item of the candidate preference activity is obtained from storage.

One example of such metadata is the user's similarity to (e.g., the number of overlapping items of interest with) the current user. For example, the more similar the user is to the current user (e.g., the greater the number of overlapping items of interest the user has with the current user), the more this factor will increase the candidate preference activity's recommendation weight.

Another example of such metadata is the user's social credibility. For example, the greater the user's social credibility, the more this factor will increase the candidate preference activity's recommendation weight. Example criteria for determining the user's social credibility includes the user's volume of interaction (e.g., comment posting) with preference activities and/or the number of users that follow the user or that the user follows such that the greater the user's volume of interaction and/or the greater the number of users that follow the user or are followed by the user, the greater the user's social credibility becomes. Social credibility may be associated with particular categories of items (e.g., a user with high social credibility associated with one or more categories may enjoy an "expert" status in those categories) or across all categories. For social credibility that is associated with particular categories of items, the user's social credibility is only considered if the candidate preference activity is associated with a preferred item within one of the categories. A user's social credibility may decay over time if there is little to no recent activity that would increase the user's social credibility.

Another example of such metadata is the user's indicated degree of preference for the preferred item. For example, if the user has indicated a degree of preference/interest for the item, then the greater the degree of indicated preference/interest for the preferred item, the more this factor will increase the candidate preference activity's recommendation weight.

Another example of such metadata is the user's indicated context/mood/reason with respect to preference for the item. For example, if the user has indicated context/mood/reason with respect to the user's preference for the item (e.g., the user prefers to read this book on a rainy day), and if the current user has indicated a current similar context/mood/reason, then this factor will increase the candidate preference activity's recommendation weight.

Another example of such metadata is the user's platform-recognized relationship with the current user. For example, the platform may recognize friendships and/or subscription relationships. If the user is friends with the current user at the platform, follows the current user, and/or is followed by the current user, then this factor will increase the candidate preference activity's recommendation weight.

Another example of such metadata is the user's social currency. For example, each user may be assigned a finite amount of social currency at the platform and the user spends an amount of social currency on each preferred item based on the total number of items that the user has indicated to prefer. As such, the more items that the user prefers, the less currency that the user "spends" on each such item. The more social currency the user spends on an item, the more this factor will increase the candidate preference activity's recommendation weight.

At 806, metadata associated with a current user is obtained. Metadata associated with the current user is obtained from storage.

One example of such metadata is the current user's currently indicated context/mood/reason. If the currently indicated context/mood/reason matches that of the context/mood/reason as indicated by the user associated with the candidate preference activity, then this factor will increase the candidate preference activity's recommendation weight.

Another example of such metadata is the current user's platform-recognized friendship and/or subscription with the user associated with the candidate preference activity. If the current user is friends with the user associated with the candidate preference activity at the platform, follows the user, and/or is followed by the user, then this factor will increase the candidate preference activity's recommendation weight.

Another example of such metadata is the current user's interaction with the preference activity. For example, interaction may include posting of comments associated with the candidate preference activity. A current user's interaction with the candidate preference activity may heavily increase the candidate preference activity's recommendation weight.

At 808, a time indication associated with the candidate preference activity is obtained. A time indication associated with candidate preference activity may be obtained from storage. Based on the time indication, an age may be determined for the candidate preference activity (e.g., by determining the length of time between such time indication and the current time). For example, the magnitude of the age may heavily decrease the candidate preference activity's recommendation weight (based on the assumption that recent activity is more interesting than older activity).

At 810, metadata associated with an item associated with the candidate preference activity is obtained. Metadata associated with an item associated with the candidate preference activity may be obtained from storage.

One example of such metadata is how many users at the platform have indicated preference for the item at the platform. For example, a large number of such users may decrease the candidate preference activity's recommendation weight (based on the assumption that the more commonly preferred an item is, the less interesting it is to any particular user).

At 812, a recommendation weight associated with the candidate preference activity is determined based on one or more of the following: the metadata associated with a user associated with the candidate preference activity, the metadata associated with a current user associated with the candidate preference activity, the time indication associated with the candidate preference activity, and the metadata associated with an item associated with the candidate preference activity. In some embodiments, values may be assigned to at least some of the factors described above and input into a function (linear or not) such that the combination of such values will yield a recommendation weight value. The above factors are merely examples and other factors may be considered in determining the recommendation weight of a candidate preference activity as well.

Below is some sample pseudocode that may be used to implement determination of the recommendation value for a candidate reference activity:

Given a current user, their preference activities, their friends at the social network platform, their social currency: an item's recommendation weight is a function of sum (item*the social currency assigned to the item from all users who "liked" it); but the social currency is a function of each user's nearness to the current user [e.g., a person's currency assigned to a recommendation weight/their distance from the current user/the age of the like]—give User(currency)=Uc, Like(age)=La, User(distance)=Ud for each item, sum(Uc/(La^k1)/(Ud^k2)). Note that the distance between a user to the current user may refer to a degree of separation between the user and the current user, such as, for example the number of intermediate social network platform recognized friends in between the two users if the two users are not friends with each other. Then sort by descending item sums. The key is that the algorithms follow a natural decay as a function of time or distance separated.

Figure 9:
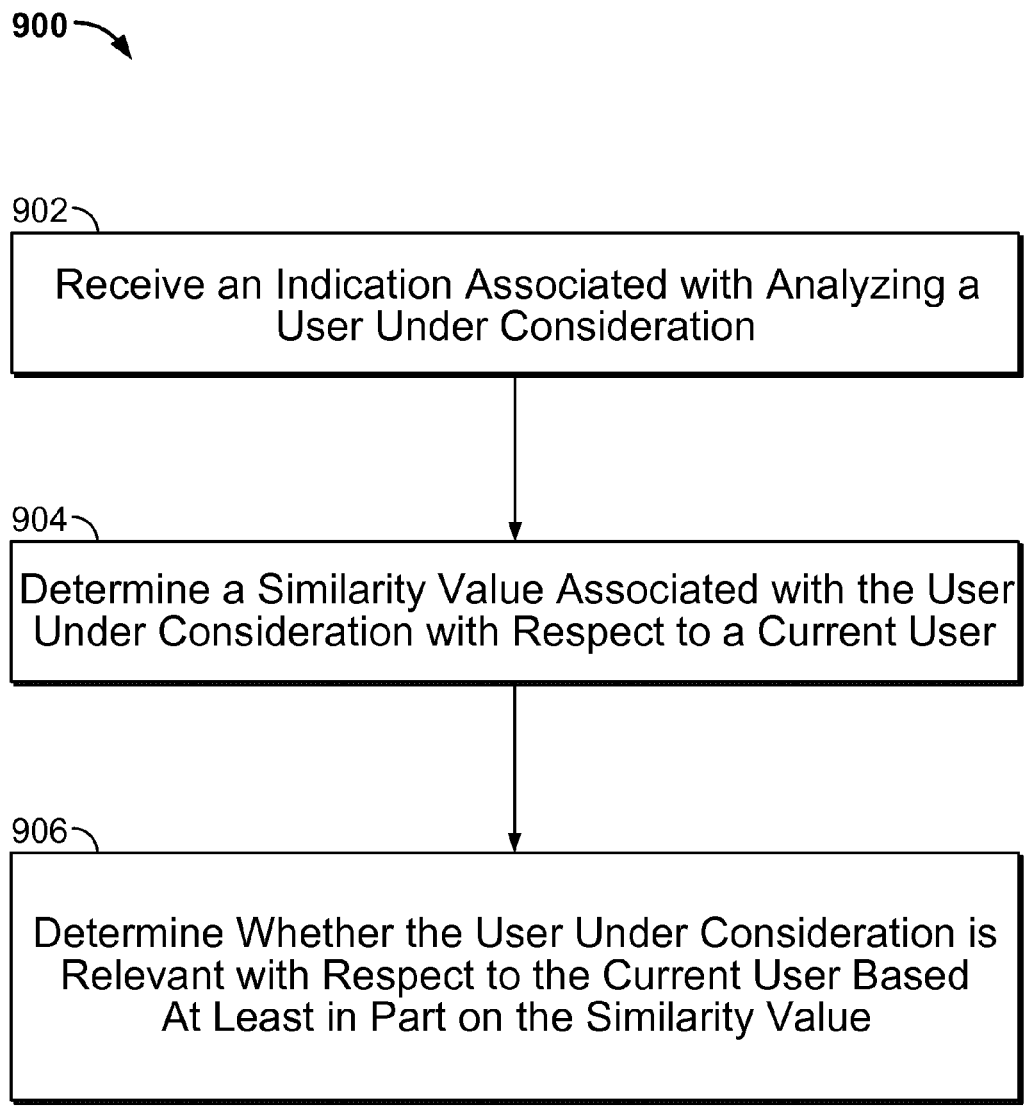
FIG. 9 is a flow diagram showing an embodiment of a process for determining whether a user is relevant to a current user.

FIG. 9 is a flow diagram showing an embodiment of a process for determining whether a user is relevant to a current user. In some embodiments, process 900 may be implemented at system 100.

In some embodiments, process 900 may be performed to determine whether a user is considered to be relevant to a current user based at least on how similar the user is to the current user. After determining whether users are relevant to the current user, in some embodiments, only the preference activities of relevant users and the preference activities of the current user are included in the set of candidate preference activities analyzed to be presented for the current user.

At 902, an indication associated with analyzing a user under consideration is received. In some embodiments, a user under consideration may comprise any user other than the current user (who is automatically considered relevant to himself or herself). In some embodiments, a user under consideration comprises a user who is determined to have at least one overlapping item of interest as the current user (i.e., the user under consideration is a matching user).

In some embodiments, a determination may first be made for the top N number of other users with the most number of overlapping items of interest as a current user, where N may comprise an integer number greater than zero configured by a system administrator. For example, N may be chosen to be 50 such that the 50 most similar users to the current user may be determined. As such, each of the top N most similar other users may be deemed a user under consideration. An example of finding the N number of other users with the most number of overlapping items of interest as a current user is described below in FIGS. 10-13.

At 904, a similarity value associated with the user under consideration with respect to a current user is determined. In some embodiments, the similarity value determined for the user under consideration with respect to the current user is determined based at least in part on the number of overlapping items of interest the user has with the current user. In embodiments where the top N number of other users with the most number of overlapping items of interest as the current user has been determined, the similarity value for each user under consideration may be the corresponding number of items of interest that the user shares with the current user.

At 906, whether the user under consideration is relevant with respect to the current user is determined based at least in part on the similarity value. In some embodiments, a threshold may be configured for the similarity value such that for a user under consideration whose similarity value exceeds the threshold, the user under consideration is determined to be relevant to the current user (e.g., and such user's preference activities will be included in the set of candidate preference activities).

In some other embodiments, other factors are considered in addition to the similarity value of a user under consideration in determining whether the user is relevant to the current user. For example, one factor may be the user under consideration's social credibility. Some examples of social credibility are described above with FIG. 8. For example, another factor may be the similarity between the user under consideration and the current user with respect to "obscure items of interest." An obscure item of interest may be an item of interest that is preferred by a small percentage of users at the social networking service platform. A user under consideration who shares one or more overlapping obscure items of interest as the current user may be considered to be more likely to be relevant to the current user. For example, another factor may be the similarity between the user under consideration and other users besides the current user. A user under consideration that shares numerous overlapping items of interest with several users besides the current user may be considered to be less likely to be relevant to the current user (e.g., because such a user may just have a large number of preferred items and his similarity to several other users diminishes his relevance to any one other user such as the current user). So, in embodiments that consider factors other than the similarity value, whether a user under consideration is determined to be relevant to the current user may be a consideration of the combination of such factors in addition to the similarity value.

FIGS. 10, 11, 12, and 13 are examples that are used to describe embodiments of determining users who have similar items of interest as a current user. As used below, a user who has at least one item of interest in common with the current user is referred to as a "matching user." As used below, to start the process of determining users who have similar items of interest as the current user, a "matching request" is issued by the current user or on behalf of the current user.

FIG. 10 is an example of a user-item database that maps each user to a list of items that the user has indicated interest. In some embodiments, the user-item database is implemented with an items database such as users database 202 of FIG. 2. In some embodiments, items in the interested items list are optionally ordered in descending order in which the user has indicated interest. In some embodiments, each item in the user-item database may be associated with one or more categories. In the example, User 1 maps to Item 1, Item 3, Item 10, and so on.

FIG. 11 is an example of an item-user database that maps each item to a list of users who have indicated interest in the item. In some embodiments, the item-user database is implemented with an items database such as items database 204 of FIG. 2. In some embodiments, each item in the item-user database may be associated with one or more categories. For example, Item 1 maps to User 1 and User 3. Thus, in response to a matching request, for each item of interest to the current user, other users who are interested in the same item are looked up in the item-user database, and sorted according to the total number of overlapping items with the current user. For example, if User 1 issues a matching request (or alternatively, a matching request is issued on behalf of the user), then, in the simple example shown in FIG. 11, User 3 would have 3 overlapping items of interest (Items 1, 2, and 11) with User 1, and User 2 would have 1 overlapping item (Item 6) of interest with User 1. In some embodiments, the system determines the user(s) with the highest number(s) of overlapping items as users most similar to the current user, and, in some embodiments, the preference activities associated with such users are included in the set of candidate preference activities.

In some embodiments, the system splits up the processing to handle large numbers of users and matching requests.

Figure 12:
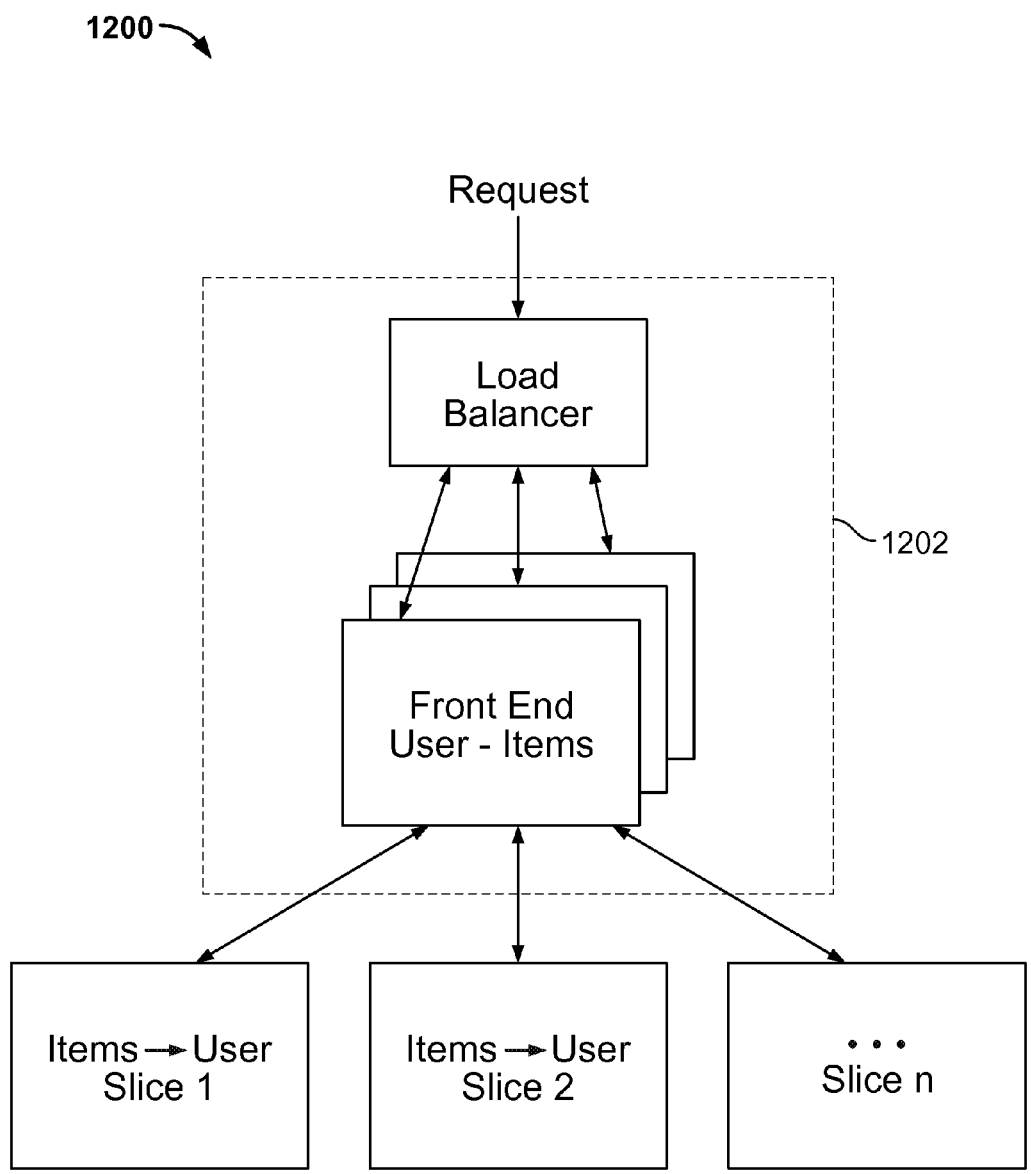
FIG. 12 is a diagram showing an embodiment of a hierarchical matching system that is highly scalable.

FIG. 12 is a diagram showing an embodiment of a hierarchical matching system that is highly scalable. In some embodiments, system 1200 may be used to implement a matching engine such as matching engine 208 of FIG. 2. In this example, a load balancer, if used, may send the received matching request for a current user to front end server 1202. Front end server 1202 looks up the user and identifies in the user-item database (such as the example shown in FIG. 10) the list of items that the current user is interested in. The list of items is split into slices and each slice of the list is assigned to one of multiple back end processes (also referred to as slice processors), which are shown in the example as slice 1, slice 2, . . . and slice n. For example, if the list of items that the current user were interested in included Items 1, 4, 5, 6, 8, 34, 76, and 99, then the list may be split into a slice including Items 1, 4, 5, and 6 that is assigned to one slice processor and another slice including Items 8, 34, 76, and 99 that is assigned to another slice processor. In some embodiments, a hashing technique is used to split the list items into slices and/or to distribute the processing load. In some embodiments, the slice processors operate in parallel and perform at least some redundant functions. Each slice processor handles a subset of the slices and returns presorted data to the front end. For example, each slice processor may process the same number of slices or a different number of slices.

In some embodiments, each slice processor is configured to process its subset of assigned slices by determining which other users have overlapping items as the current user (matching users) among the current user's items of interest in the subset of slices assigned to that slice processor. In some embodiments, each slice processor is configured to also sort these matching users based on each user's total count of overlapping items (e.g., where each overlapping item is represented by one count) as determined by that slice processor. By processing the subsets of the items of interest of a current user in parallel, the processing time for each request is reduced. Front end server 1202 merges the presorted data received from the slice processors, and identifiers corresponding to the matching users with the most number of overlapping items of interest as the current user (e.g., highest total counts) are returned (e.g., such that the preference activities associated with these users may be included in the set of candidate preference activities).

Figure 13:
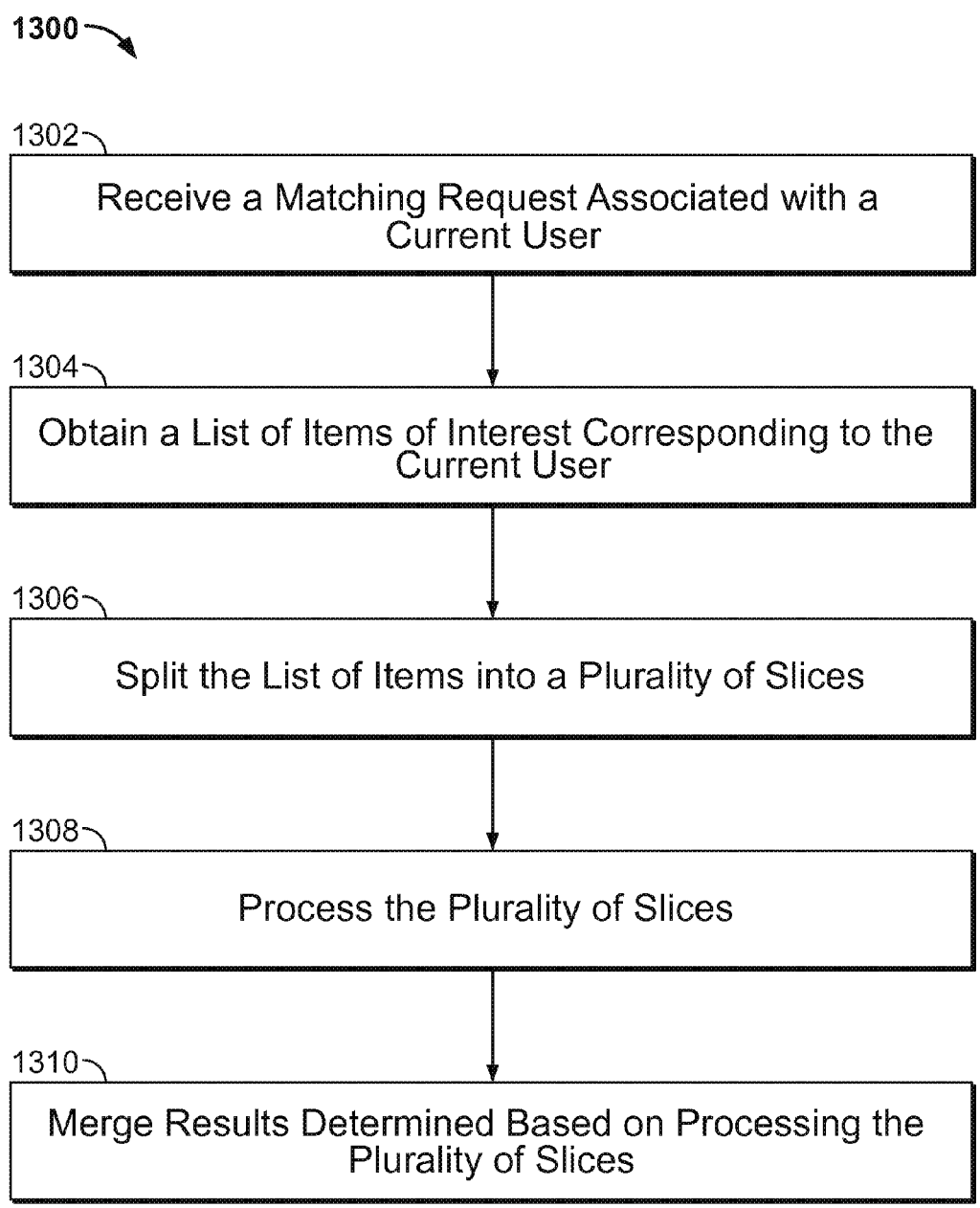
FIG. 13 is a flow diagram illustrating an embodiment of a matching process.

FIG. 13 is a flow diagram illustrating an embodiment of a matching process. At 1302 of process 1300, a matching request associated with a current user is received. For example, a matching request may be issued whenever the current user indicates for population of the current user's feed page with preference activities. For example, a matching request may seek to find users who are similar to User 3 as shown in the example of FIG. 10. At 1304, the corresponding list of items of interest corresponding to the current user is obtained. In this example, as shown in the example of FIG. 10, User 3 is interested in Items 1, 11, 2, 5, and 7. At 1306, the list of items is split into a plurality of slices. For example, the list of items is split into subsets, referred to as slices, which are assigned to one or more slice processors. For example, slice 1 may include Items 1, 2, and 5, and slice 2 may include Items 7 and 11.

At 1308, the plurality of slices is processed. In some embodiments, the subsets of the lists of items corresponding to the current user are processed at least partially in parallel across the one or more slice processors. In some embodiments, a slice is handled by counting the users that have an interest in each item of the slice and excluding the user requesting the query, returning a sorted list of these other users based on their respective counts of overlapping items that they share with the current user. For example, for slice 1, Item 1 corresponds to Users 1 and 3 (as shown in FIG. 11), thus Users 1 and 3's respective counts (which are initially set to 0) are incremented; Item 2 corresponds to Users 1 and 3, and Users 1 and 3's respective counts are incremented again; and Item 5 corresponds to User 3 and User 3's count is incremented again. Accordingly, User 1 has a count of 2 and User 3 has a count of 3. Since User 3 is the current user, he is excluded from the list, and the result that is returned includes User 1 with a count of 2. For slice 2, Item 7 corresponds to Users 2 and 3, and Item 11 corresponds to Users 1 and 3. Accordingly, Users 1, 2, and 3's counts are 1, 1, and 2, respectively, and User 3 is excluded for being the current user. Thus, the result that is returned from processing the slices includes User 1 (count 3) and User 2 (count 1).

At 1310, results determined based on processing the plurality of slices are merged. In some embodiments, results that include presorted data (e.g., a list of matching users sorted based on their respective counts) are returned from each of the slice processors and merged. In some embodiments, merging includes combining the presorted data from the one or more slice processors and determining via sorting which users have the most counts and are therefore the most similar to the current user. In the example, User 1 has a count of 3, and User 2 has a count of 1. Thus, User 1 is most similar to User 3, having 3 overlapping items of interest. User 2 is the second most similar to User 3, having 1 overlapping item of interest. In some embodiments, the matching request may include a particular number (e.g., as predetermined by a platform operator or input by a current user) of most similar users whose associated preference activities are to be included in the set of candidate preference activities.

In some embodiments, matching requests are serviced even though users that exist in the system and their items of interest may be updated frequently. This is because the internal data store used to store the user-item and item-user relationships are designed using concurrently updatable lists. This pattern allows existing users to be running matching requests while parallel updates are being performed on the data, without requiring global read or write locks across the data. For example, if the matching process were implemented using Java, this is solved using ConcurrentSkipList objects. Internally, when a query is scanning across a large SkipList and a concurrent update occurs, the update occurs on a future version of the data that will eventually be atomically set as the live data set. Put in other words, when a matching request is in process and data needs to be concurrently updated, processing the matching request will proceed based on the not yet updated data and the data will be updated once the matching request is completed. As a result, the platform is designed to work across noisy data; data that will be eventually consistent, but can be transiently inconsistent. In other words, while the data is never quite coherent, matching requests may still be serviced.

In some embodiments, generation counters are used to speed up change detection associated with items and/or users and may be used in performing matching requests for users. It is assumed that the platform is a read mostly network—e.g., a much larger fraction of read operations than update operations occur. Thus, each time the platform is updated, generation counter(s) associated with the item(s) and/or users that are updated are incremented (e.g., by one). For example, updates in the system may include when a new item of interest is added for a user, when an existing item of interest is removed for a user, and when a user starts to follow or stops following another user. For example, a user that exists in the system may be associated with a generation counter such that each time the list of items of interest corresponding to that user is updated or each time a new platform-recognized relationship between the user and another user is updated or each time that another user with whom the user has a platform-recognized relationship is updated, the generation counter associated with the user is monotonically increased (e.g., by an increment of one). Also, for example, an item of interest that exists in the system may be associated with a generation counter such that each time a user adds or removes the item to his/her list of items of interest, the generation counter associated with the item is monotonically increased (e.g., by an increment of one). In some embodiments, when a matching request is being processed, a version of the state of the current user and the current user's list of items of interest may be determined based on the values of the corresponding generation counters and at least some of the sorted data may be cached with this version number. For example, the sorted data may include the sorted list of users having the most number of overlapping items of interest as a current user, each of the users other than the current user's associated number of overlapping items of interest as the current user, a user's corresponding list of items of interest, and/or an item's corresponding list of users that are interested in that item. Thus, in a subsequent matching request that includes a user and/or an item formerly included in the processing of a previous matching request, it is checked whether the version of the state of the current user and the current user's list of items of interest have changed since a previous matching request based on the values of the corresponding generation counters. If some values on the corresponding generation counters have changed, then at least some of the data to be used in processing the request needs to be recomputed. But if some values on the corresponding generation counters have not changed, then in some cases, some of the sorted data cached with the previous version of data may be used without needing to recompute data or at least without needing to recompute at least some of the data. In a simple example, in processing a matching request for user Alice, if cached data associated with a previous matching request processed for user Alice is available and it is determined that none of the generation counters have changed since the previous matching request, then the cached data may be retrieved to determine the most similar users to user Alice without needing to recompute such other users.

The following is an example of an implementation of an optimized technique of processing a matching request for a user in the system:

In the platform for matching users with similar interests, there can be a large number (millions or more) of users and items of users. Since the data is retrieved from the item-user tables at the back end and sent to the merge systems at the front end server (e.g., such as the front end server 1202), speedup can occur if this results data (e.g., matching users and their respective counts of overlapping items as the current user among each subset of processed slice data) is partially sorted by the back end slice processors. This allows the front end server's merging of the results to determine, at an earliest possible time, when it has sufficiently determined the most similar users to the current user to complete the matching request. For example, this partially sorted results data streamed from a particular slice processor is data associated with matching users sorted in a descending order by their respective counts of overlapping items of interest as the current user among the subset of the current user's items of interest that was processed by that slice processor. However, since matching users may be found in more than one of the back end slice processors because each slice processor determines matching users for only a subset of the current user's items of interest, the front end server cannot perform a pure merge sort of the top matching users. For example, User 1 may be found to be a matching user by a first slice processor based on having 9 overlapping items of interest among the subset of items processed by the first slice processor and User 1 may also be found to be a matching user by a second slice processor based on having 3 overlapping items of interest among the subset of items processed by the second slice processor, which means that a merge process will determine that User 1 must have at least (3+9=) 12 overlapping items with the current user. So, in some embodiments, the front end server must build a merge buffer to keep track of the data merged from the partially sorted data returned from the slice processors until it is determined that no additional results data returned from the slice processors can be encountered that will rearrange the merged data associated with the users that have the most number of overlapping items of interest as the current user. Put another way, in this implementation of the merging process, in some cases, it is possible to process less than all of the presorted data from the slice processors if it is determined after merging over one or more rounds of presorted data from the slice processors that the most similar users (users that have the most number of overlapping items of interest as the current user) have been found. For example, data may be streamed from each back end slice processor to an accumulator function at the front end server, all while the accumulator function accumulates users' (other than the current user's) total counts (i.e., number of overlapping items of interest as the current user) from all slice processors. When it is determined that each back end slice processor's additional data can no longer contribute to moving the result set comprising data associated with the most similar users, merging of the partially sorted data from the slice processors can be cut off early. For example, if the matching request seeks to find the top 3 most similar users, then once such top users are determined by the merge process, the merge process may end.

In this example, assume that a matching request seeks to find the N most similar users to the current user, where N is an integer greater than zero. In this implementation of the matching process, the basic rule by which to end the merge process because the top N most similar users have been found is if the additional streaming of presorted data from the one or more slice processors can no longer rearrange the top N users. In this implementation, the subsets of the list of the items of interest corresponding to the current user are processed by respective slice processors that each generates presorted data including a sorted list of matching users in descending order of counts (i.e., the number of overlapping items of interest as the current user). If merging of the presorted data generated by the slice processors occurred in a round robin manner, then in each round, the subsequent user and corresponding count (which together is referred to as a stream value) is taken from the presorted list generated by each slice processor and added to the merge buffer. The merge buffer includes entries corresponding to matching users and their respective accumulated (summed) counts as determined from values streamed from sorted lists of the slice processors up until the current round. Also, the entries of the merge buffer are sorted based on the respective accumulated counts. As such, entries associated with the top N positions in the merge buffer are occupied by the N matching users that are currently determined to be the most similar as the current user.

It is determined that the top N positions can no longer be rearranged by a subsequent round of streaming and merging values from the presorted lists generated by the slice processors by: 1) noting when a user's accumulated count is updated by values streamed from all possible slice processors (i.e., once stream values associated with the same user have been streamed from every slice processor, the accumulated count for that user can no longer be further updated); 2) keeping track of the largest stream value from any individual slice processor in the current round of streaming; 3) noting the accumulated count difference between users in adjacent positions in the merge buffer.

In this example, the merging process may cut off if one of the following criteria is met: 1) if the sum of the stream values from each slice processor in a subsequent round of streaming and merging is less than the gap between adjacent positions in the top N positions of the merge buffer (e.g., no combination of data from a subsequent round can rearrange the top positions of the merge buffer), then the merge process ends. Or, 2) if the accumulated counts of the top N most similar users have each been updated from each slice processor and the sum of stream values from each slice processor in a subsequent round of streaming and merging is less than the gap between the accumulated counts of the Nth and Nth+1 users in the merge buffer, then the merge process ends.

In this streaming example, four slice processors (Slice 1, Slice 2, Slice 3, and Slice 4) each generates a list of presorted matching users and their corresponding counts (stream values), where each list is ordered by count descending and user identifier (ID) ascending where more than one user shares the same count. The slice processors and their corresponding lists are in the following table, Table 1, where the user identifier and count is written in the form of UID:CountOfUID. Because, in this example, the processing occurs in a round robin merge fashion, each column of stream values associated with Slices 1, 2, 3, and 4 are added to the merge buffer per each round of streaming and merging. So each column is labeled with the round number in which the column's stream values will be merged. As will be shown in the example below, not every round of stream values needs to be necessarily processed in order to determine the top N most similar users.

TABLE 1

|  | Round 1 | Round 2 | Round 3 | Round 4 | Round 5 | Round 6 |
| --- | --- | --- | --- | --- | --- | --- |
| Slice 1 | U1:10 | U3:2 | U17:2 | U18:1 | U22:1 | U23:1 |
| Slice 2 | U22:10 | U1:2 | U17:1 | U18:1 | U40:1 | n/a |
| Slice 3 | U23:5 | U1:1 | U18:1 | U17:1 | U52:1 | n/a |
| Slice 4 | U17:10 | U1:1 | U18:1 | U40:1 | U55:1 | U56:1 |

Assume that in this example, the matching request seeks the top 3 most similar users to the current user. The following tables show the updated merge buffers during each round of streaming and merging values from the presorted lists of data from the four slice processors. During each round, the subsequent stream value (e.g., the stream value from each subsequent column of Table 1) from each slice processor is merged into the merge buffer. For example, if a stream value from Slice 1 comprising UX:3 is merged into the merge buffer that includes an entry of UX:12, then the count of 3 from Slice 1's stream value will be added to the accumulated count of 12 for the entry of UX in the merge buffer and the updated entry of UX:15 will be moved to the appropriate sorted position within the merge buffer. However, if no entry previously existed for UX in the merge buffer, then UX:3 will be added as a new entry at the appropriate sorted position within the merge buffer. In the following tables, the format of entries in the merge buffer is UID:AccumulatedCount[set] where UID is the user identifier, AccumulatedCount is the current accumulated count of overlapping items for UID, and the [set] is a flag that indicates from which slice processor(s) stream values associated with this user have been encountered. For example, the notation of UX:15[1,3.] indicates that stream values associated with UX have been encountered on Slices 1 and 3 so far (but not yet from Slices 2 or 4) and that 15 is the accumulated count based on the stream values associated with UX from Slices 1 and 3.

Round 1:

| Received stream values | Updated Merge Buffer Positions | | | |
|---|---|---|---|---|
| U1:10 from Slice 1 | U1:10[1...] | | | |
| U22:10 from Slice 2 | U1:10[1...] | U22:10[.2..] | | |
| U23:5 from Slice 3 | U1:10[1...] | U22:10[.2..] | U23:5[..3.] | |
| U17:10 from Slice 4 | U1:10[1...] | U17:10[...4] | U22:10[.2..] | U23:5[..3.] |

Round 2:

| Received stream values | Updated Merge Buffer Positions | | | | |
|---|---|---|---|---|---|
| U3:2 from Slice 1 | U1:10[1...] | U17:10[...4] | U22:10[.2..] | U23:5[..3.] | U3:2[..1.] |
| U1:2 from Slice 2 | U1:12[12..] | U17:10[...4] | U22:10[.2..] | U23:5[..3.] | U3:2[..1.] |
| U1:1 from Slice 3 | U1:13[123.] | U17:10[...4] | U22:10[.2..] | U23:5[..3.] | U3:2[..1.] |
| U1:1 from Slice 4 | U1:14[1234] | U17:10[...4] | U22:10[.2..] | U23:5[..3.] | U3:2[..1.] |

Round 3:

| Received stream values | Updated Merge Buffer Positions | | | | | |
|---|---|---|---|---|---|---|
| U17:2 from Slice 1 | U1:14[1234] | U17:12[1..4] | U22:10[.2..] | U23:5[..3.] | U3:2[..1.] | |
| U17:1 from Slice 2 | U1:14[1234] | U17:13[12.4] | U22:10[.2..] | U23:5[..3.] | U3:2[..1.] | |
| U18:1 from Slice 3 | U1:14[1234] | U17:13[12.4] | U22:10[.2..] | U23:5[..3.] | U3:2[..1.] | U18:1[..3.] |
| U18:1 from Slice 4 | U1:14[1234] | U17:13[12.4] | U22:10[.2..] | U23:5[..3.] | U3:2[..1.] | U18:2[..34] |

After the completion of Round 3, based on the current state of the merge buffer, it appears that no additional round(s) of stream data can cause U23 or any users below U23 to be associated with an accumulated count great enough to displace any of the users at the top 3 positions (U1, U17, and U22) in the merge buffer, but a further round is needed to make sure that the users within the top 3 positions cannot be reordered. It can also be determined that the difference in accumulated counts between U1 and U17 is only 1 and that U17 may still have a stream value associated with a count of 1 or greater from Slice 3 that could at least tie the accumulated count of U17 to that of U1, so the merge processing proceeds to Round 4.

Round 4:

positions in the top N positions of the merge buffer) has been met. The top 3 most similar users to the current user are therefore determined to be User 1 with 14 overlapping items, User 17 with 14 overlapping items, and User 22 with 10 overlapping items and the merging process can end early (i.e., the matching process does not need to process stream values in Rounds 5 or later). For example, the identifiers associated with Users 1, 17, and 22 may be returned to the current user.

The other stream values sorted by the four slice processors that would have been processed in Rounds 5 or later (U22:1, U40:1, U52:1, U55:1, U23:1, and U56:1) may also be cached and processed later (e.g., in the event that the users requests to find the top 4 most similar users in a future matching request).

| Received stream values | Updated Merge Buffer Positions | | | | | | |
|---|---|---|---|---|---|---|---|
| U18:1 from Slice 1 | U1:14[1234] | U17:13[12.4] | U22:10[.2..] | U23:5[..3.] | U18:3[1.34] | U3:2[..1.] | |
| U18:1 from Slice 2 | U1:14[1234] | U17:13[12.4] | U22:10[.2..] | U23:5[..3.] | U18:4[1234] | U3:2[..1.] | |
| U17:1 from Slice 3 | U1:14[1234] | U17:14[1234] | U22:10[.2..] | U23:5[..3.] | U18:4[1234] | U3:2[..1.] | |
| U40:1 from Slice 4 | U1:14[1234] | U17:14[1234] | U22:10[.2..] | U23:5[..3.] | U18:4[1234] | U3:2[..1.] | U40:1[...4] |

Figure 14:
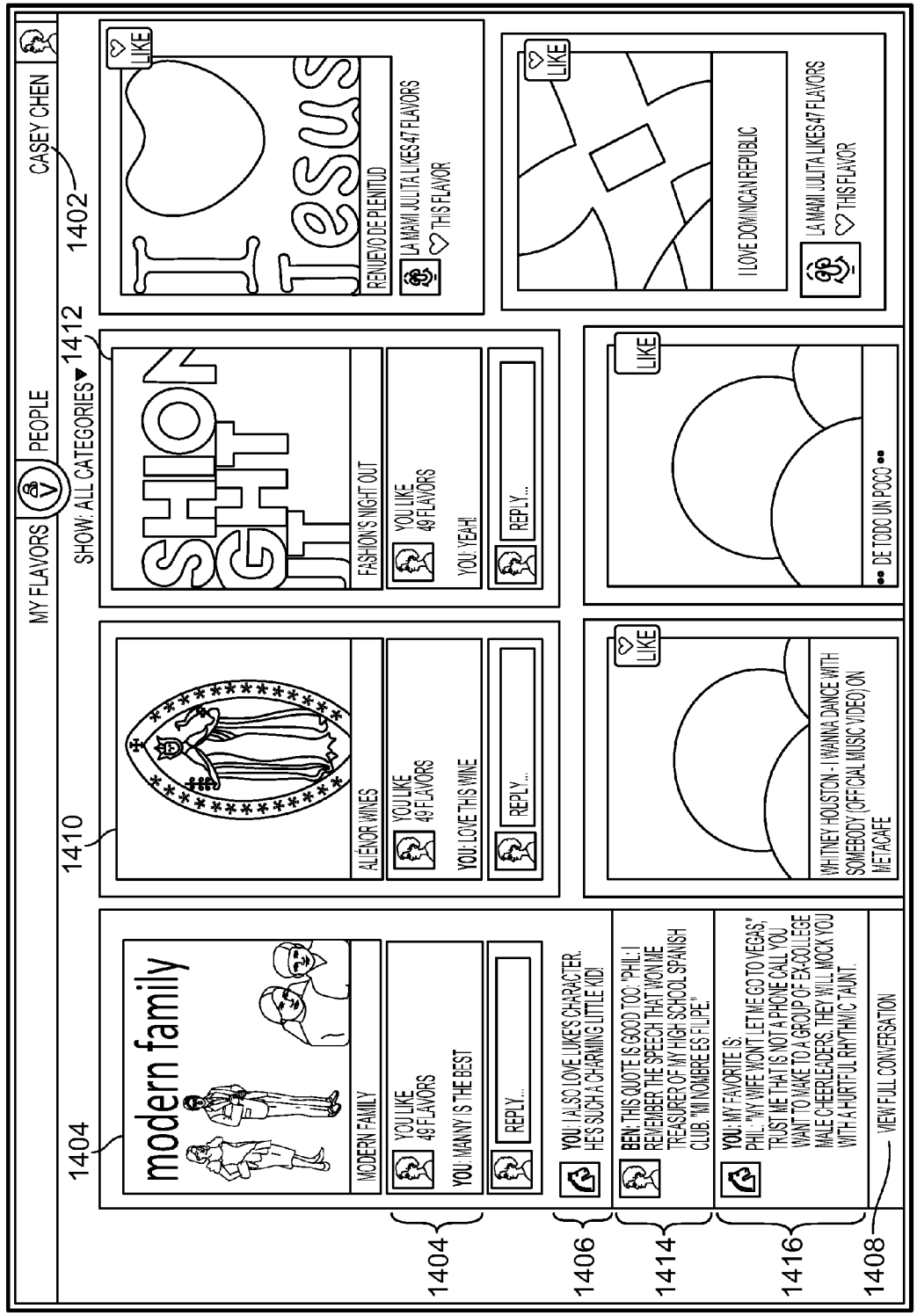
FIG. 14 is an example of a user interface associated with a feed page populated for a current user with comments posted at presented preference activities.

Now that Round 4 is completed, even though U17 is now tied with U1 for the greatest accumulated count, since stream values associated with U1 and U17 are now obtained from all 4 slice processors and the gap between the accumulated count of either U1 and U17 to that of U22 is 4, the most that any subsequent rounds can do is add 3 to the accumulated count of U22 (because the current maximum value of any remaining stream values on Slices 1, 3 and 4 is each 1 which means the most additional count that U22 can obtain is 3, which is still less than the difference between the current accumulated count of U22 and the accumulated count for U1 or U17) so the matching process is stopped because the 1) criterion for stopping a merging process early (that if the sum of the stream values from each slice processor in a subsequent round of streaming and merging is less than the gap between adjacent FIG. 14 is an example of a user interface associated with a feed page populated for a current user with comments posted at presented preference activities. In some embodiments, the user interface of FIG. 14 is presented to a current user that is logged onto the example social networking service platform Socialflavor™, in response to the current user's selection to view a feed page. In the example, the name ("Casey Chen") and picture of the current user is indicated in area 1402 of the user interface. In the example, presented preference activities 1404, 1410, and 1412 (which have been selected to be presented by virtue of their high recommendation weights) have had comments in association with them. In some embodiments, each display of a preference activity at a current user's feed page may be the basis for posting comments/starting a conversation thread by the user associated with the preference activity. In the example shown, preference activities 1404, 1410, and 1412 were indicated to be preferred by the current user, Casey, and so Casey has posted comments at each of such preference activities. While not shown in the example, current user Casey may also reply to conversations started by other users in association with their respective preference activities that are presented at the feed page. As will be described below, a comment posted at a displayed preference activity at a current user's feed page may appear on other platform-related webpages as well.

In the example, a conversation comprising of multiple comments posted by different users is associated with preference activity 1404 (which is associated with the television show "Modern Family"). Because preference activity 1404 is preferred by Casey, Casey had the opportunity to start a conversation, which she has with the first comment, comment 1404, of "Manny is the best." In the example, each comment is displayed with at least an image associated with the commenting user, an identifier associated with the commenting user (e.g., the first name of the user if the user is not the current user and "You" if the user is the current user). Below comment 1404 is comment 1406 that was posted by Casey, comment 1414 that was posted by user Ben, and comment 1416 that was posted by Casey. The "View full conversation" 1408 element may be selected to show the other comments that are currently hidden. In some embodiments and as will be further described below, in the event that there are more than a predetermined number of comments associated with a presented preference activity, the comments may be evaluated such that a subset of comments that are determined to be the most interesting are presented for the current user while the remainder of the comments is hidden (e.g., until the current user selects an element such as "View full conversation" 1408).

Figure 15:
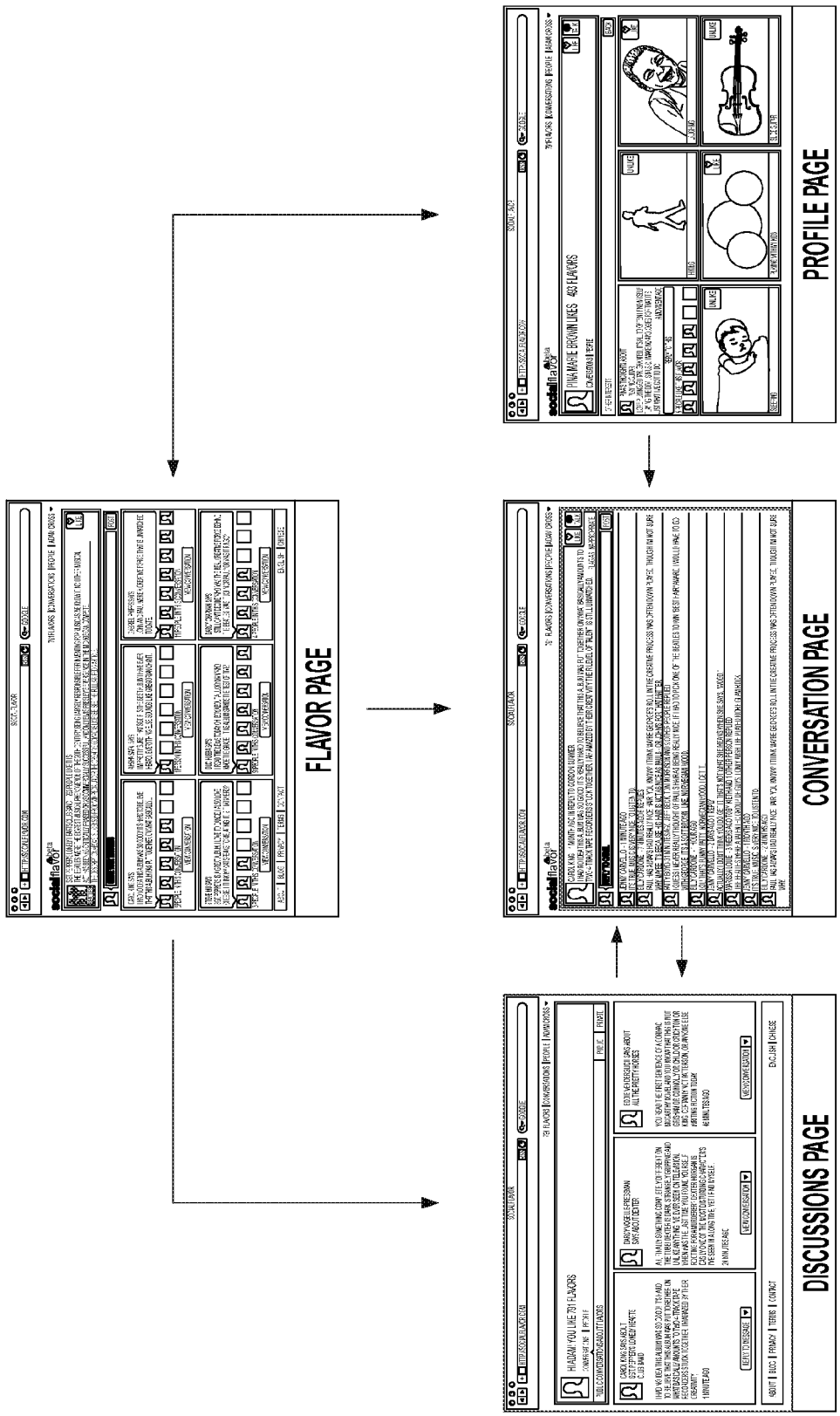
FIG. 15 is a diagram illustrating an example conversation interaction flow.

FIG. 15 is a diagram illustrating an example conversation interaction flow. In this example, on the Socialflavor™ website, a user tracks items he is interested in ("flavors") in his profile page. Examples of flavors include imported Facebook® "likes," Yelp® reviews, Amazon® ratings, iTunes® purchases, Netflix® ratings, etc.

In this example, a flavor has a dedicated flavor page. The user can start or follow a conversation regarding a particular flavor by accessing the flavor page. Once he indicates preference in a certain flavor, a preference activity is generated and the flavor is added to his profile page.

In this example, a conversation page displays all the comments within a particular set of comments in response to an original comment about a preference activity. In some embodiments, the set of comments is referred to as a conversation thread. For example, returning to the example of FIG. 14, a current user may be directed to this conversation page if the user selected the image associated with a relevant preference activity that is presented to the current user at the current user's feed page.

The user can browse the flavor page to select conversations of interest to him. He can also follow other users' comments in a conversation thread. Once he "likes" a flavor, new comments about the flavor are sent to a feed page. Also, new comments in a conversation he is in will also be sent to his discussions page, which shows various conversations in which the user has contributed at least one comment.

The user can enter a comment directly on the tile shown on a feed page, or on the flavor page as a posting. It will go to the discussions page for everybody who likes this flavor, but people who do not share the flavor will not receive the comment.

Figure 16:
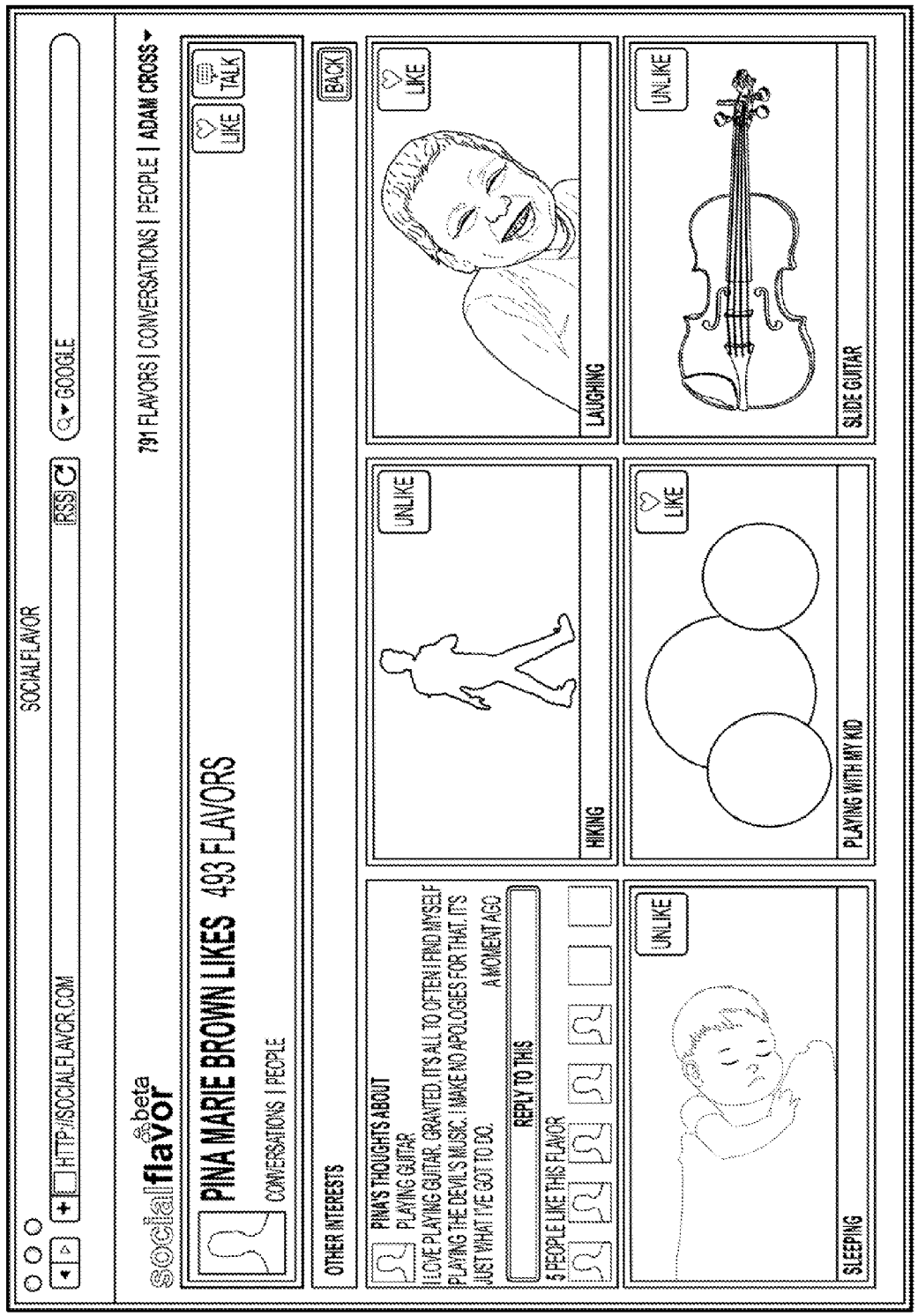
FIG. 16 is a diagram that illustrates an example of a profile page.

FIG. 16 is a diagram that illustrates an example of a profile page. The member profile is a visual representation of the users' items of interest (flavors). These flavors may be organized into categories like movies, books, people, food, other interests, etc. The layout is presented as a series of clickable flavor tiles that, when a tile is clicked, it flips over to reveal other users who like the flavor, as well as the latest thought or comment posted on that flavor. Users are able to respond to the existing comment, or write their own thoughts on the subject. Responses trigger the conversation page, while new comments get posted on the corresponding flavor page as new conversations, which in turn go out to the discussion pages of those who like the flavor. This user interface leverages the power of the visual medium, enabling users to respond to the flavors' imagery and share their thoughts in the moment for any given flavor. If the user whose profile another user is viewing wrote a comment about a flavor, it will be shown when the other user "flips" the tile over by clicking on it. This gives the viewer a quick and in-depth way of getting to know the commenting user.

A user can start getting conversations about a flavor by indicating his preference (e.g., "liking" a flavor). In the example shown, the user has indicated interest in the flavor "playing guitar." Therefore, he will receive any new root conversations about this flavor in his discussions page.

Figure 17:
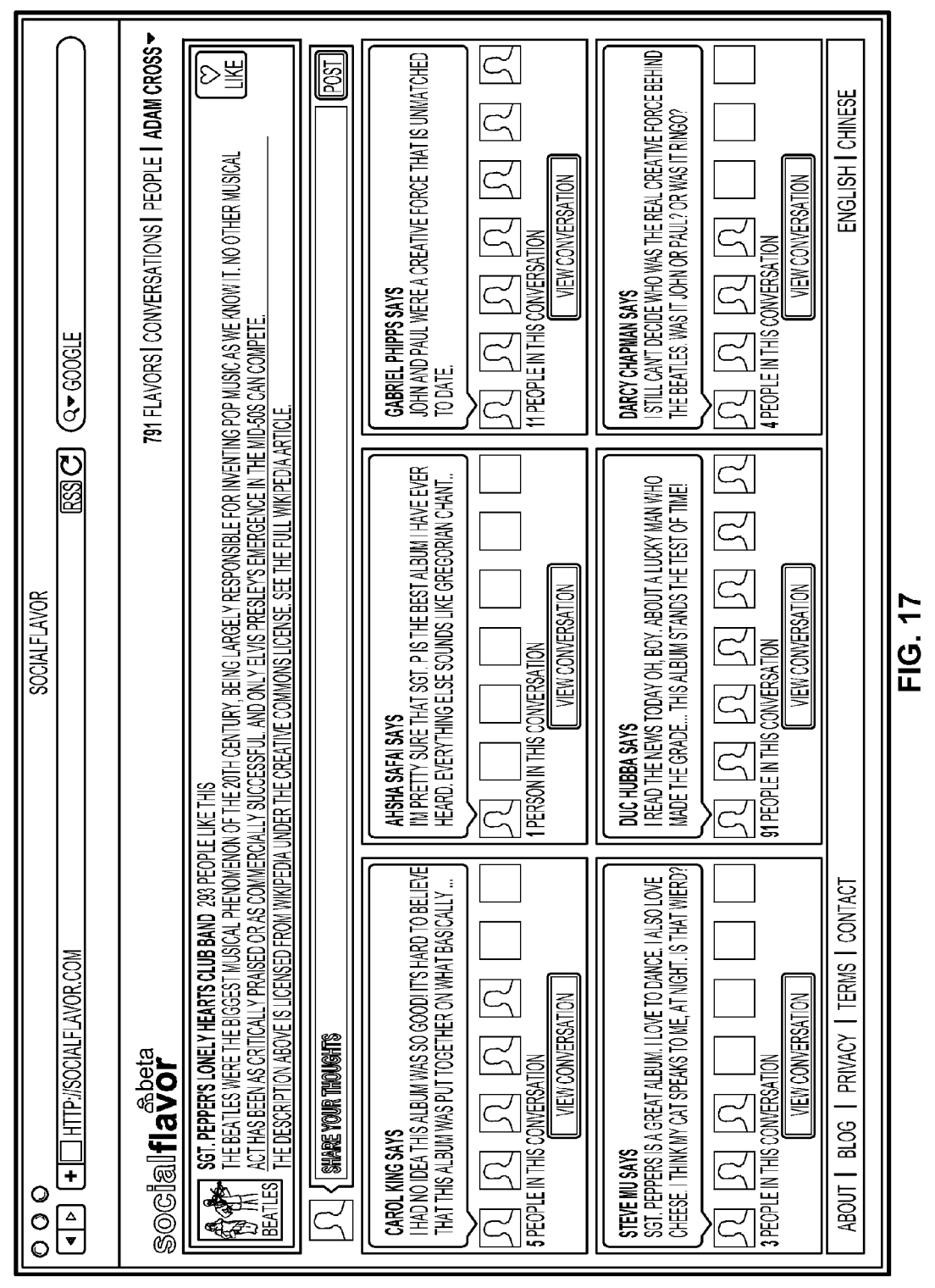

FIG. 17 illustrates an example flavor page. Every flavor has its own dedicated page where users can start conversations by posting questions, comments, opinions, etc. Users can also choose to participate in any of the existing conversations on the page. These conversations are sort-ordered by date (although other embodiments can use similarity), with the most recent post appearing in the upper left corner. Every time a new conversation is started, it goes out to the member discussion pages of those who like that flavor.

For example, if a user likes Persian food, he might post the question, "What are the best restaurants in the Bay Area for Persian food?" This question would be visible to anyone who comes across the flavor page for Persian food, but it would also go directly to the discussion pages of everyone on Socialflavor™ who likes Persian food and has added the flavor "Persian food" to their profile. Furthermore, as users respond to the user's question, all of their suggestions would go directly into the user's discussion page.

In the example shown, the flavor pertains to Beatle's Album "Sgt. Pepper's Lonely Hearts Club Band." In this case, conversation threads started by Carol, Ahsha, Gabriel, Steve, Duc, Darcy, etc. are displayed. These conversations are referred to as root level conversations since they are created directly in connection with the flavor itself. A user can view the conversation threads in a conversation page.

Figure 18:
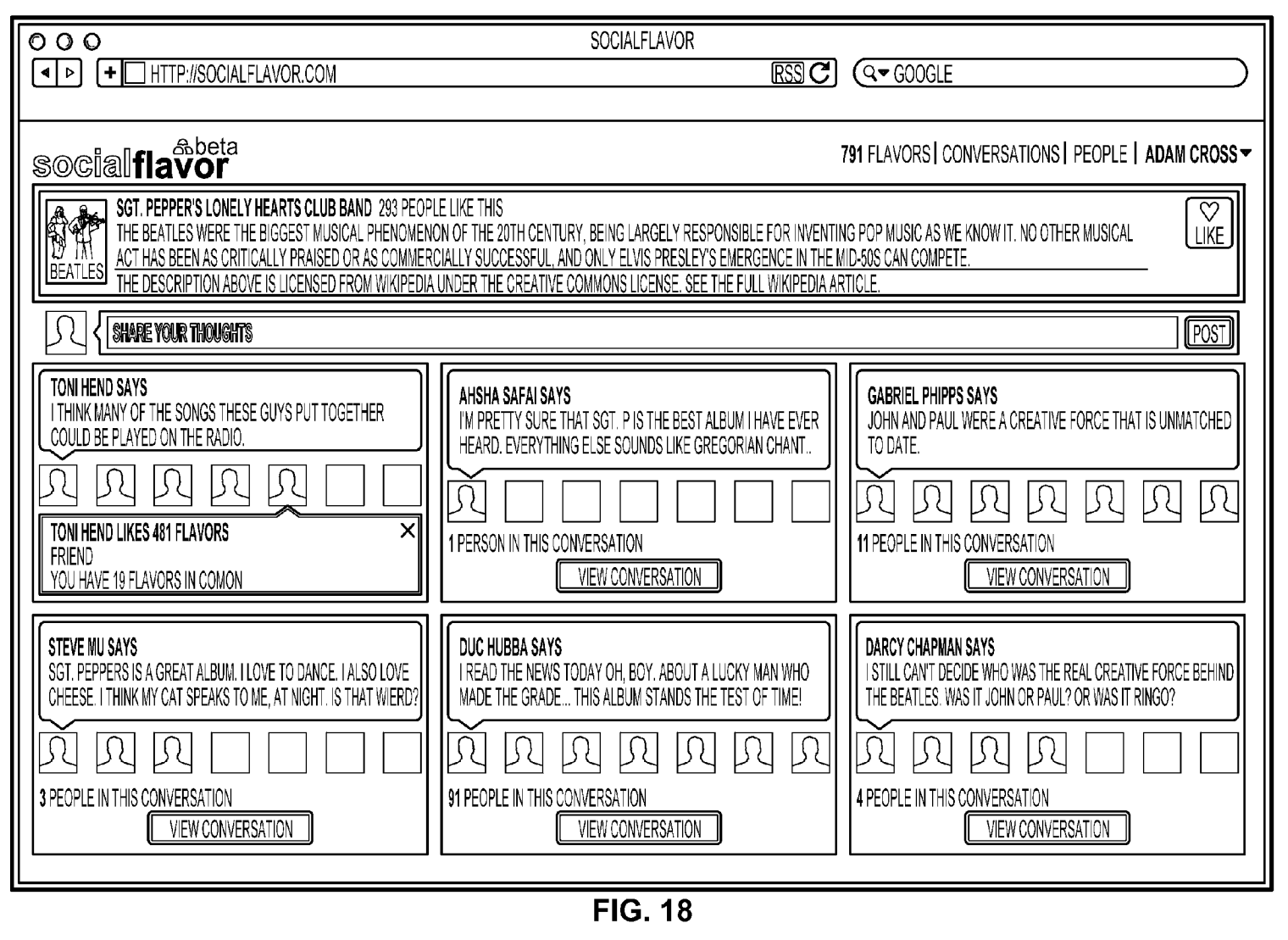

FIG. 18 illustrates an example flavor page that gives a preview of the users who made comments in a conversation thread. Thumbnail pictures of the commenting users are displayed. The viewing user can mouse-over the thumbnail and get a preview about the particular user. As will be described in greater detail below, in some embodiments, the user comments are sorted based on similarity-based weight calculations.

Every question or comment posted on a flavor page (or on a flavor tile from a member's profile page) gets its own dedicated conversation page. The user may select to view the details of a particular conversation.

Figure 19:
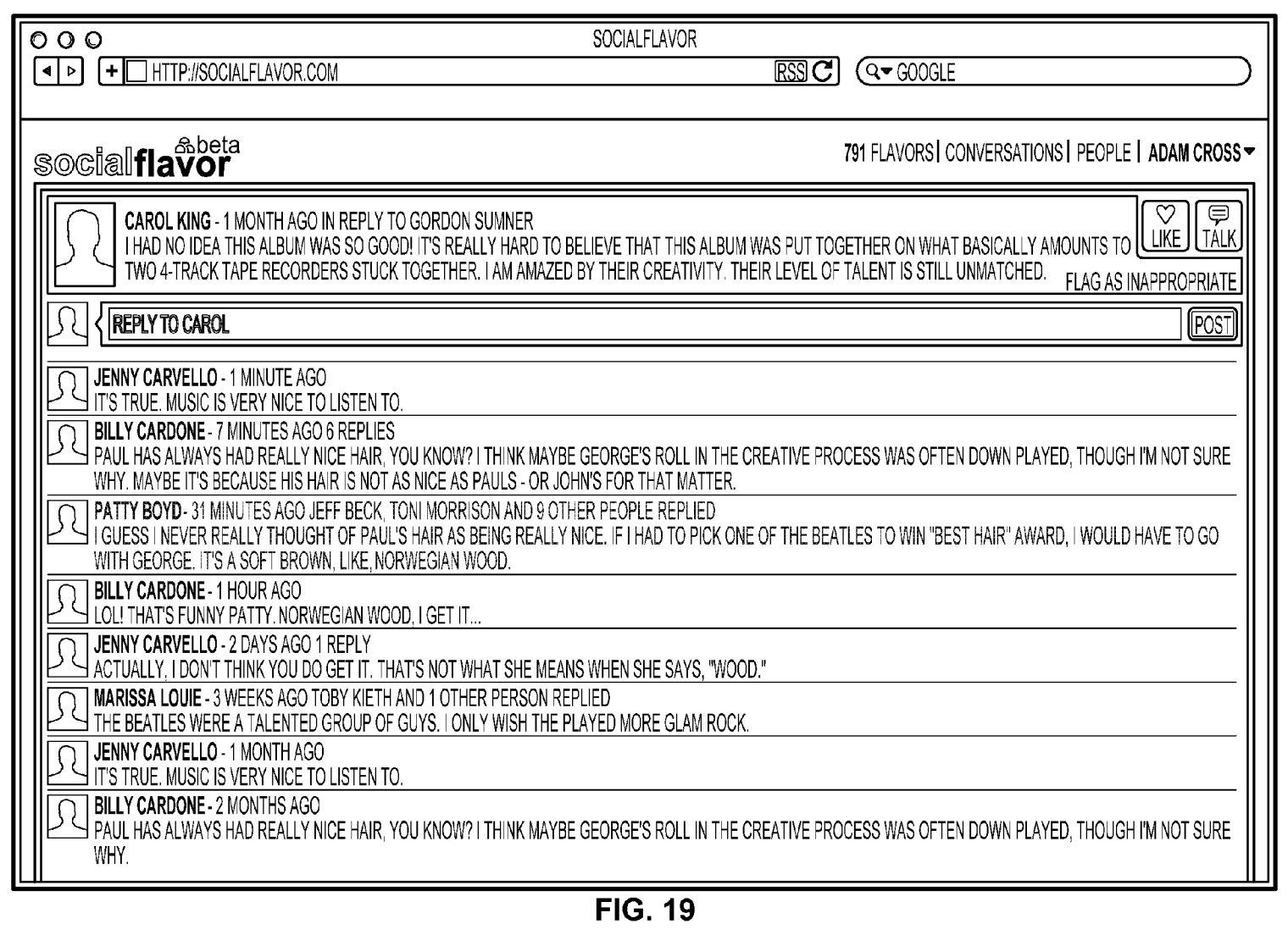

FIG. 19 is an example conversation page. This page includes the original comment or question, all replies to the initial comment or question, as well as any sub-threads that may develop. The conversation page can vary in size, from a single initial comment with no replies, to a lengthy interaction with multiple sub-threads.

For example, a user might start a conversation by posting a comment on Taylor acoustic guitars. On the flavor tile in the user's profile he writes, "I love Taylor guitars. They are tremendously playable with great tone." This comment will be seen by others (on the flavor page, or on the flip tile on the user's profile, or in his discussion page if they like Taylor guitars) and someone might reply, "Me too! They are fantastic guitars." People could continue to reply to the original comment, or perhaps be prompted to reply to someone else's reply, thus creating a sub-thread.

In the example page shown, Carol King started a conversation regarding the "Sgt. Pepper" album. Other users participated in the conversation and all the comments in response to Carol's comment are displayed in the conversation page. In addition, users can also follow the comments made by other users. For example, Patty Boyd's comment received 9 follow-up comments, forming a sub-thread of its own. The viewing user may select Patty's comment, which will bring up a conversation page that displays Patty's comment and the comments in response to Patty.

Instead of merely listing comments chronologically, the platform weighs the comments and displays the comments according to their display score. In some embodiments and as will be further discussed below, criteria used to weigh the listings include how many flavors the original user who started the thread has in common with the current user, how much the users posting the follow-up comments have in common with the current user, whether (and how closely) the original poster and/or follow-up posters is/are connected to the current user. Other embodiments can have more complicated algorithms factoring other measures of similarity such as age, location, gender, etc. A commenting user who shares more flavors with a current user than others is deemed to be more similar to the current user than others; thus, the comment made by this commenting user will be assigned a greater weight and will be listed higher in the conversation page.

The conversation display allows multiple levels of sub-threads. The current user can follow a main conversation thread, a subthread, a subthread of a subthread, etc., by clicking on someone's comment and replying to the comment. The interface also allows the current user to select on the previous level and return to it. The point at which the current user engages in the conversation (e.g., posting a comment to a conversation) is when the current user starts to participate and gets updates on the conversation in his discussion page.

Figure 20:
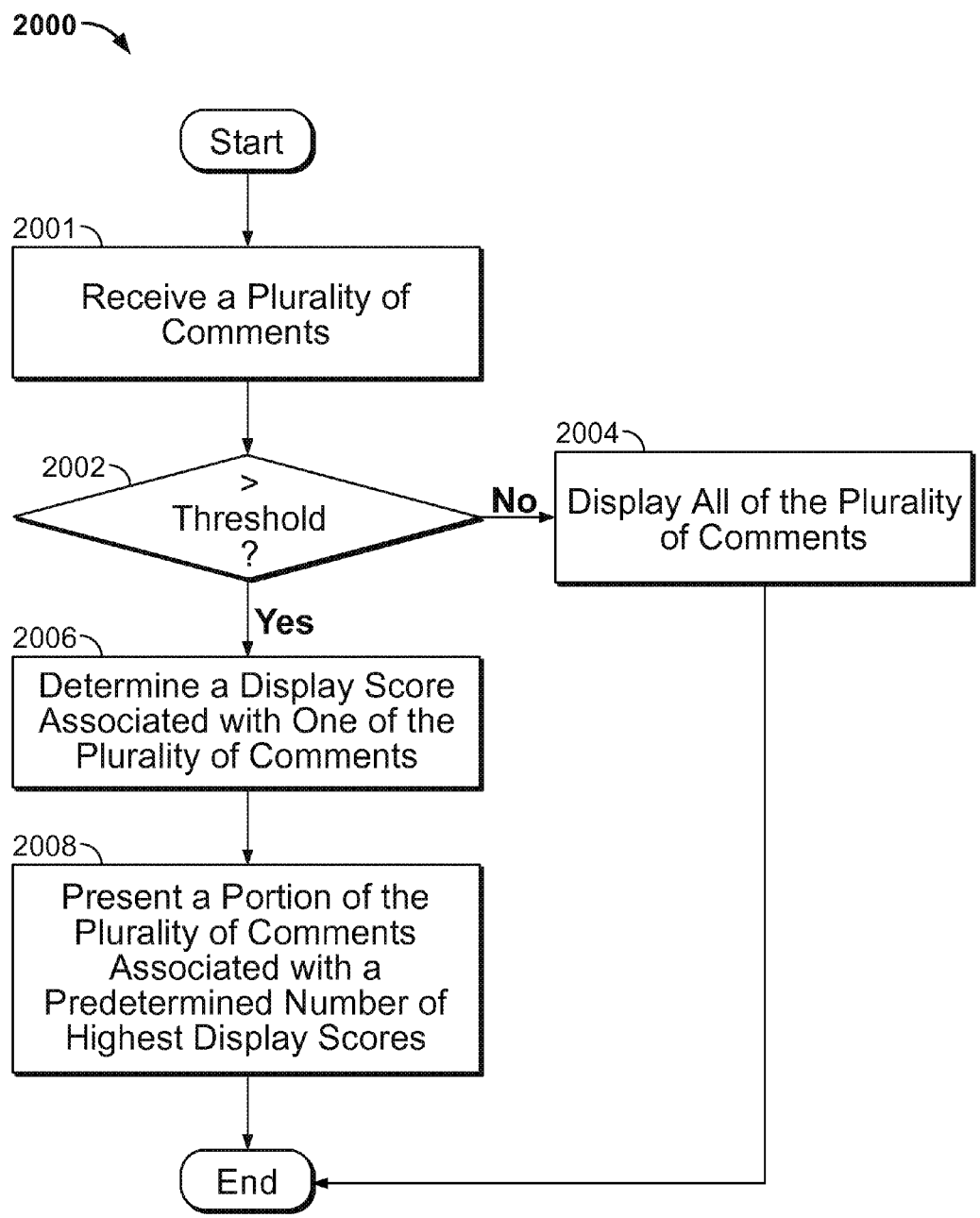
FIG. 20 is a flow diagram showing an embodiment of presenting comments.

FIG. 20 is a flow diagram showing an embodiment of presenting comments. In some embodiments, process 2000 is implemented at system 100.

Process 2000 may be used to determine which of a set of comments to display in association with a preference activity (e.g., presented at a feed page) or an item of interest ("flavor") (e.g., presented at a user profile page). In some embodiments, posting all comments associated with each preference activity or item of interest may be visually overwhelming for a current user so a subset of all comments is chosen to be displayed instead.

At 2001, a plurality of comments is received. For example, the set of comments may be associated with a preference activity or an item of interest.

At 2002, it is determined whether the number of comments in the set exceeds a threshold number of comments. For example, a threshold number of comments may be configured by a system administrator. The threshold number may be chosen to be a maximum number of comments that may be presented at once with a preference activity or item of interest. In the event that the number of comments does not exceed the threshold number, then control passes to 2004, in which all the comments of the set are displayed. In the event that the number of comments exceeds the threshold number, control passes to 2006.

At 2006, a display score associated with one of the plurality of comments is determined. Because the threshold number of comments has been exceeded, 2006 is to be used to determine which of the subset of comments is to be displayed by determining a display score associated with each such comment. In some embodiments, several factors may be considered in determining a display score for a comment. For example, how many items of interest the original user who started the conversation thread has in common with the current user, how many items of interest the user posting the follow-up comment have in common with the current user, and whether (and how closely) the original poster and/or follow-up posters is/are connected (e.g., through a platform-recognized relationship) to the current user. Other embodiments can have more complicated algorithms factoring other measures of similarity such as age, location, gender, the density of words in the comment, and/or the number of unique words included in the comment, for example.

At 2008, a portion of the plurality of comments associated with a predetermined number of highest display scores is presented. Once a display score is determined for each comment in the set, the comments are ranked in a descending order of display scores. A high display score indicates that the comment is more likely of interest to the current user. In some embodiments, a predetermined number of comments associated with the highest display scores is displayed with the preference activity or item of interest, while the remaining comments are hidden until the current user makes a selection associated with viewing the remaining comments.

Figure 21:
FIG. 21 illustrates an example discussions page.

FIG. 21 illustrates an example discussions page. The feed discussions displays recent activities (e.g., comments) associated with the user's flavors. In particular, comments since the current user's last visit are displayed.

The discussions page provides users with 2 streams of conversations: public streams which include flavor-based conversations, new initiations of root level conversations (not sub-threads) to any flavor the current user likes, as well as any updates to conversations the current user is participating in; private streams which include user-to-user conversations and interactions between two users. Private streams are only visible to the current user. When a user views another user's conversation feed, the first will only see the public comments made by the second user.

In some embodiments, the same user interface with a public mode and a private mode is used for displaying feeds. FIG. 21 illustrates the interface in public mode where public streams are received and displayed. The current user may view a conversation, add comments to a conversation, hide a conversation he is no longer interested in so he will no longer receive any feeds, block comments from another user, flag the comment as inappropriate, etc.

Figure 22:
FIG. 22 illustrates the same interface in private mode where private streams are received and displayed.

FIG. 22 illustrates the same interface in private mode where private streams are received and displayed. The current user has the options to reply to the message, hide the message, block messages from the message's sender, flag a message as inappropriate, etc.

In another aspect, the platform provides real-time updates that indicate when a user is posting a comment. Other users can follow-up with that user or his/her comment, for example, by sending private messages or publically posting comments in response.

In another aspect, the platform allows user-policing in identifying inappropriate messages/comments. A message/comment that is flagged as inappropriate but does not clearly violate the website's rules is displayed to the users who are interested in the conversation (and/or flavor) for voting on whether the message/comment is (in)appropriate. A message/comment is only deemed to be (in)appropriate if the platform receives at least a threshold number of votes indicating its (in)appropriateness.

In some embodiments, the conversations are processed by a comment processor and presented to the users in the manner described above. In one example, the comment processor further includes a front end processor that follows the rules described above. The actual content of the conversations is persisted in a local cache and persistent data store. The match system described above acts as a high speed comment index that efficiently selects and sorts the return responses.

Internally the comment data is stored hierarchically—each comment that is added references a 'parent' entity—either a topic, user, or another comment. And as comments are added, key data is also included, such as who made the comment and when the comment was made. This data comprises the comment database which is stored in the recommendation engine. This parent-child relationship is internally represented as a directed graph, where the edges are bidirectional and the nodes are pre-sorted according to the comment ordering. For example, the comments are ordered according to date descending.

Then, queries can be run across this database, programmatically selecting and sorting the database to return the desired results. For example, the pseudo code for a topic level query looks like:
- Given a topic being viewed and a user doing the viewing (these are pre-ordered by date descending)
- Add each top level comment that refers to this comment
- Continue the above according to the count/offset parameters specified in the query
- For each comment actually added to the list, select a participant list based on the overlap rules inherent in the recommendation engine between the user commenting and the user viewing Presenting preference activities in a determined order for users is described above. By assigning each candidate preference activity a recommendation weight based on various factors, those candidate preference activities that are likely to be of the most interest to a current user will be identified based on their high recommendation weights. Then, candidate preference activities are then presented for the current user in a manner that reflects their respective recommendation weights such that candidate preference activities with higher recommendation weights will be seen earlier. In some embodiments, similar weighting is applied to the comments associated with such preference activities to determine a manner of presenting a subset of the comments assumed to be of the most interest to the current user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining preference activities to present to a current user, comprising:
   one or more processors configured to:
   obtain a plurality of candidate preference activities, wherein a candidate preference activity comprises an instance of a user indicating preference for an item, wherein at least some of the plurality of candidate preference activities is associated with a plurality of comments submitted by one or more users;
   select a subset of the plurality of candidate preference activities, wherein the subset of the plurality of candidate preference activities comprises candidate preference activities performed by a plurality of relevant users with respect to the current user, wherein a relevant user is determined based at least in part on a corresponding similarity value with respect to the current user;
   determine a recommendation weight for one of the subset of the plurality of candidate preference activities with respect to the current user; and
   present at least some of the subset of the plurality of candidate preference activities based on recommendation weights corresponding to the subset of the plurality of candidate preference activities, wherein to present the at least some of the subset of the plurality of candidate preference activities includes to present one or more comments associated with a presented candidate preference activity with the presented candidate preference activity, wherein the one or more comments associated with the presented candidate preference activity are submitted by at least a subset of the one or more users, wherein to present the one or more comments associated with the presented candidate preference activity with the presented candidate preference activity includes to:
   determine whether a quantity of comments included in the one or more comments associated with the presented candidate preference activity exceeds a threshold quantity of comments;
   in the event that the quantity of comments included in the one or more comments associated with the presented candidate preference activity exceeds the threshold quantity of comments, determine a subset of the one or more comments associated with the presented candidate preference activity to present with the presented candidate preference activity; and
   a memory coupled to the one or more processors and configured to provide the processors with instructions.

2. The system of claim 1, wherein the one or more processors are further configured to:
   receive an indication associated with a preference for an item and data associated with a user; and
   store metadata associated with a new preference activity including data associated with at least the user and the item.

3. The system of claim 1, wherein the recommendation weight is determined based at least in part on one or more of the following: a social credibility associated with a relevant user associated with the candidate preference activity, a social currency associated with the relevant user associated with the candidate preference activity, a similarity between the relevant user associated with the candidate preference activity and the current user, a degree of interest indicated by the relevant user associated with the candidate preference activity, a context indicated by the relevant user associated with the candidate preference activity, and a friendship or subscription relationship between the relevant user and the current user.

4. The system of claim 1, wherein the recommendation weight is determined based at least in part on one or more of the following: a context indicated by the current user, a friendship or subscription relationship between a relevant user associated with the candidate preference activity and the current user, and one or more interactions associated with the current user and the candidate preference activity.

5. The system of claim 1, wherein the recommendation weight is determined based at least in part on a timestamp associated with the candidate preference activity.

6. The system of claim 1, wherein the recommendation weight is determined based at least in part on a number of users who have indicated preference for an item associated with the candidate preference activity.

7. The system of claim 1, wherein the similarity value is determined based at least in part on a number of overlapping items of interest the relevant user is determined to share with the current user.

8. The system of claim 1, wherein the one or more processors are further configured to rank the subset of the plurality of candidate preference activities based at least in part on the recommendation weights.

9. The system of claim 8, wherein the one or more processors are further configured to present the at least portion of the subset of the plurality of candidate preference activities based on the ranking.

10. The system of claim 1, wherein to determine the subset of the one or more comments associated with the presented candidate preference activity to present with the presented candidate preference activity includes to determine a display score associated with a comment of the one or more comments and to determine to present the comment with the presented candidate preference activity based at least in part on the display score associated with the comment.

11. A method for determining preference activities to present to a current user, comprising:
obtaining a plurality of candidate preference activities, wherein a candidate preference activity comprises an instance of a user indicating preference for an item, wherein at least some of the plurality of candidate preference activities is associated with a plurality of comments submitted by one or more users;
selecting, using one or more computer processors, a subset of the plurality of candidate preference activities, wherein the subset of the plurality of candidate preference activities comprises candidate preference activities performed by a plurality of relevant users with respect to the current user, wherein a relevant user is determined based at least in part on a corresponding similarity value with respect to the current user;
determining a recommendation weight for one of the subset of the plurality of candidate preference activities with respect to the current user; and
presenting at least some of the subset of the plurality of candidate preference activities based on recommendation weights corresponding to the subset of the plurality of candidate preference activities, wherein presenting the at least some of the subset of the plurality of candidate preference activities includes presenting one or more comments associated with a presented candidate preference activity with the presented candidate preference activity, wherein the one or more comments associated with the presented candidate preference activity are submitted by at least a subset of the one or more users, wherein presenting the one or more comments associated with the presented candidate preference activity with the presented candidate preference activity includes:
determining whether a quantity of comments included in the one or more comments associated with the presented candidate preference activity exceeds a threshold quantity of comments;
in the event that the quantity of comments included in the one or more comments associated with the presented candidate preference activity exceeds the threshold quantity of comments, determining a subset of the one or more comments associated with the presented candidate preference activity to present with the presented candidate preference activity.

12. The method of claim 11, further comprising:
receiving an indication associated with a preference for an item and data associated with a user; and
storing metadata associated with a new preference activity including data associated with at least the user and the item.

13. The method of claim 11, wherein the recommendation weight is determined based at least in part on one or more of the following: a social credibility associated with a relevant user associated with the candidate preference activity, a social currency associated with the relevant user associated with the candidate preference activity, a similarity between the relevant user associated with the candidate preference activity and the current user, a degree of interest indicated by the relevant user associated with the candidate preference activity, a context indicated by the relevant user associated with the candidate preference activity, and a friendship or subscription relationship between the user and the relevant current user.

14. The method of claim 11, wherein the recommendation weight is determined based at least in part on one or more of the following: a context indicated by the current user, a friendship or subscription relationship between a relevant user associated with the candidate preference activity and the current user, and one or more interactions associated with the current user and the candidate preference activity.

15. The method of claim 11, wherein the recommendation weight is determined based at least in part on a timestamp associated with the candidate preference activity.

16. The method of claim 11, wherein the recommendation weight is determined based at least in part on a number of users who have indicated preference for an item associated with the candidate preference activity.

17. The method of claim 11, wherein the similarity value is determined based at least in part on a number of overlapping items of interest the relevant user is determined to share with the current user.

18. The method of claim 11, further comprising ranking the subset of the plurality of candidate preference activities based at least in part on the recommendation weights.

19. The method of claim 18, further comprising presenting the at least portion of the subset of the plurality of candidate preference activities based on the ranking.

20. A computer program product for determining preference activities to present to a current user, the computer program product being embodied in a non-transitory computer readable storage medium and comprising computer instructions for:
obtaining a plurality of candidate preference activities, wherein a candidate preference activity comprises an instance of a user indicating preference for an item, wherein at least some of the plurality of candidate preference activities is associated with a plurality of comments submitted by one or more users;
selecting a subset of the plurality of candidate preference activities, wherein the subset of the plurality of candidate preference activities comprises candidate preference activities performed by a plurality of relevant users with respect to the current user, wherein a relevant user is determined based at least in part on a corresponding similarity value with respect to the current user;

determining a recommendation weight for one of the subset of the plurality of candidate preference activities with respect to the current user; and presenting at least some of the subset of the plurality of candidate preference activities based on recommendation weights corresponding to the subset of the plurality of candidate preference activities, wherein presenting the at least some of the subset of the plurality of candidate preference activities includes presenting one or more comments associated with a presented candidate preference activity with the presented candidate preference activity, wherein the one or more comments associated with the presented candidate preference activity are submitted by at least a subset of the one or more users, wherein presenting the one or more comments associated with the presented candidate preference activity with the presented candidate preference activity includes:

determining whether a quantity of comments included in the one or more comments associated with the presented candidate preference activity exceeds a threshold quantity of comments;

in the event that the quantity of comments included in the one or more comments associated with the presented candidate preference activity exceeds the threshold quantity of comments, determining a subset of the one or more comments associated with the presented candidate preference activity to present with the presented candidate preference activity.

* * * * *